United States Patent
Black et al.

(10) Patent No.: US 10,186,819 B2
(45) Date of Patent: *Jan. 22, 2019

(54) HEIGHT-ADJUSTABLE TABLE WITH FLEXIBLE ELECTRICAL POWER DISTRIBUTION CABLE

(71) Applicant: Premier Manufacturing Group, Inc., Shelton, CT (US)

(72) Inventors: David Black, Orange, CT (US); Michael O'Keefe, Wethersfield, CT (US); Bernard Bensussan, Monroe, CT (US); Michael Brandstatter, Ansonia, CT (US); Robert Glenn, Chicago, IL (US)

(73) Assignee: Premier Manufacturing Group, Inc., Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,384

(22) Filed: Feb. 25, 2018

(65) Prior Publication Data

US 2018/0212378 A1 Jul. 26, 2018

Related U.S. Application Data

(63) Continuation of application No. 15/179,911, filed on Jun. 10, 2016, now Pat. No. 9,912,112.

(60) Provisional application No. 62/175,255, filed on Jun. 13, 2015.

(51) Int. Cl.
*H01R 25/00* (2006.01)
*H02J 7/00* (2006.01)
*H01R 13/66* (2006.01)
*H01R 13/447* (2006.01)

(52) U.S. Cl.
CPC ......... *H01R 25/006* (2013.01); *H01R 13/447* (2013.01); *H01R 13/6675* (2013.01); *H02J 7/0052* (2013.01); *H02J 2007/0062* (2013.01)

(58) Field of Classification Search
CPC ....... H01R 25/006; A47B 21/06; A47B 21/00; A47B 21/02; A47B 37/00; A47B 2037/005; A47B 83/001; E04B 2002/7483
USPC ................ 439/527, 531; 108/50.02; 52/36.1; 312/223.2, 223.3, 223.6
See application file for complete search history.

(56) References Cited

U.S. PATENT DOCUMENTS 6,712,433 B2 * 3/2004 Hellwig ................. A47B 21/00
312/196

* cited by examiner

*Primary Examiner* — Vanessa Girardi
(74) *Attorney, Agent, or Firm* — Raymond A. Nuzzo

(57) ABSTRACT

A height-adjustable table includes a worktop having a top surface, a bottom surface and height-adjustable legs. An electrical power center is attached to the bottom surface of the worktop and has a housing, electrical interface connectors mounted to the housing and electrically connected to each other, and an electrical power source receptacle electrically connected to the electrical interface connectors. The table has a first power cable having a first electrical interface connector electrically connected to one of the electrical interface connectors of the power center and a second electrical interface connector secured to the bottom surface of the worktop. The table includes a second power cable having a first electrical interface connector electrically connected to another of the electrical interface connectors of the power center and a second electrical interface connector secured to the bottom surface of the worktop.

6 Claims, 25 Drawing Sheets

HEIGHT-ADJUSTABLE TABLE WITH FLEXIBLE ELECTRICAL POWER DISTRIBUTION CABLE

CROSS REFERENCE TO OTHER PATENT APPLICATIONS

This application is a continuation of U.S. application Ser. No. 15/179,911, filed Jun. 10, 2016, now U.S. Pat. No. 9,912,112, which application claims the benefit of U.S. application No. 62/175,255, filed Jun. 13, 2015. The disclosures of U.S. application no. 62/175,255 and Ser. No. 15/179,911 are hereby incorporated by reference in their entireties.

STATEMENT OF GOVERNMENT INTEREST

Not applicable.

TECHNICAL FIELD

The present invention generally relates to height-adjustable tables.

BACKGROUND

Height-adjustable tables or workstations are very popular and commonly used in offices. Height-adjustable tables allow a user to raise or lower their own individual work surface, independent of other workers, so they can sit or stand while working. This flexibility gives the user the ability to shift their work environment around the task or operation at hand in an effort to minimize fatigue and/or discomfort throughout the day. Since a typical height-adjustable table can be adjusted vertically between 21 and 48 inches off the floor, it is difficult to provide desktop power receptacles in a manner that is acceptable to the end user. If a standard desktop electrical power receptacle device is plugged into an electrical receptacle at the floor and has sufficient power cord length to reach the highest position of the height-adjustable table, the power cord will pool on the floor when the height-adjustable table is lowered. Conversely, if the power cord is made short enough so as not fall on the floor when the table is lowered, the power cord will not be long enough to allow the height-adjustable table to be raised to maximum height. Typically, in a work environment, there is a plurality of height-adjustable tables wherein each height-adjustable table has its own electrical power receptacle device. Each power receptacle device is plugged into an electrical power receptacle in the floor. When a large number of height-adjustable tables are used, there will necessarily be a large number of corresponding power cords on the floor. Furthermore, there may not be a sufficient number of electrical power receptacles in the floor. Such a scenario typically results in the users using extension cords or multi-receptacle converters that plug into a receptacle and allow a user to plug in multiple devices. However, such practices can create dangerous and unsafe working conditions. Another disadvantage of prior art height-adjustable tables is that the power cords, which are plugged into electrical power receptacles in the floor and electrically connected to the power receptacles on the height-adjustable table, prevent the height-adjustable tables from being repositioned to another location within the office space.

SUMMARY

In some embodiments, the invention is directed to a height-adjustable table comprising a worktop having a top surface, a bottom surface, a first end and an opposite second end. The height-adjustable table further comprises a first telescopic leg having an upper end and a lower end wherein the upper end is attached to the bottom surface of the worktop, a first base member attached to the lower end of the first telescopic leg, a second telescopic leg having an upper end and a lower end wherein the upper end of the second telescopic leg is attached to the bottom surface of the worktop, and a second base member attached to the lower end of the second telescopic leg. The first and second telescopic legs allow the height of the worktop to be increased or decreased. The height-adjustable table further comprises an electrical power center attached to the bottom surface of the worktop such that the electrical power center moves upward or downward with the worktop as the height of the worktop is increased or decreased. The electrical power center comprises a housing, a pair of electrical interface connectors mounted to the housing and electrically connected to each other, and at least one electrical power source receptacle that is electrically connected to the pair of electrical interface connectors. The height-adjustable table further comprises a first power cable having first and second electrical interface connectors, wherein the first electrical interface connector of the first power cable is electrically connected to one of the pair of the electrical interface connectors of the electrical power center. The height adjustable table further comprises a first bracket attached to the bottom surface of the worktop and in proximity to the first end of the worktop. The first bracket secures the second electrical interface connector of the first power cable to the bottom surface of the worktop. The height adjustable table further comprises a second power cable having first and second electrical interface connectors, wherein the first electrical interface connector of the second power cable is electrically connected to the other one of the pair of electrical interface connectors of the electrical power center. The height adjustable table further comprises a second bracket attached to the bottom surface of the work top and in proximity to the opposite second end of the worktop. The second bracket secures the second electrical interface connector of the second power cable to the bottom surface of the worktop.

In some embodiments, the invention is directed to a height-adjustable table having a flexible electrical power distribution cable. The height-adjustable table comprises an electrical power hub device attached to the underside of the height-adjustable table. The electrical power hub device comprises at least one electrical power receptacle (e.g. 110-120 VAC) and at least one USB device charging port. In other embodiments, the electrical power hub device includes connectors and ports for Ethernet cables, telephone wires and other data cables. Because the electrical power hub device is attached to the underside of the height-adjustable table, the electrical power receptacles and USB charging ports move upward and downward with the height-adjustable table as the height of the table is adjusted upward and downward. The electrical power hub device includes a storage compartment to manage and store all the power cords and cables so as to prevent these cords and cables from becoming tangled under the height-adjustable table. Such a feature prevents damage to these power cord and cables during use of the height-adjustable table. A user can plug the electrical power cords for his or her computer or computer screen, or other equipment, into the electrical power receptacles in the electrical power hub device. The user can even plug a secondary power extension device into the electrical power hub device. The user may also plug his or her cell phone charging-cable into the USB charging port in the electrical power hub device. All excess portions of electrical power cords, cables and cell phone cords can be neatly wrapped up and stored in the cord storage compartment. Since all the excess cords and cables are stored in the storage compartment, the electrical power hub device, the cords and cables connected to the user's equipment and the cables stored in the storage compartment will move or ride with the height-adjustable table as the height of the table is raised and lowered.

The electrical power hub device further comprises a pair of power hub cables that are electrically connected to internal wiring of the electrical power hub device. Each power hub cable has an electrical connector at each end thereof. A flexible electrical power distribution cable assembly is used to provide electrical power to the height-adjustable table. The flexible electrical power distribution cable assembly comprises an electrical interface connector at each end thereof, a flexible chain-like harness between the electrical interface connectors and electrical cables or wires secured within the flexible chain-like harness. Each electrical interface connector has a structure that is configured to be removably secured or attached to a corresponding complementary mating bracket or connector that is attached to the underside of the height-adjustable table. When the electrical interface connector of the flexible electrical power distribution cable assembly is removably secured or attached to the bracket, the corresponding power hub cable can be electrically connected to the electrical interface connector of the flexible electrical power distribution cable assembly. Thus, electrical power carried by the flexible electrical power distribution cable assembly flows through the electrical interface connector, the power hub cable and the internal electrical wiring in the electrical power hub device. The electrical power receptacles and USB voltage converter circuitry are electrically connected to the internal electrical wiring. In other embodiments, data and telephony cables and wires are also secured within the chain-like harness.

A plurality of flexible electrical power distribution cable assemblies are used to daisy-chain the electrical power hubs of a plurality of height-adjustable tables. The very first or the very last flexible electrical power distribution cable assembly in the daisy-link configuration includes a male electrical plug for electrical connection to a source of electrical power, such as an electrical power receptacle in the floor or wall. Due to the flexibility of the flexible electrical power distribution cable assembly, the height of a height-adjustable table may be raised or lowered independently of the other height-adjustable tables in the daisy-chain without any interruption to electrical power or data connectivity. The electrical interface connectors of the flexible electrical power distribution cable assembly may be easily removed from its corresponding complementary mating bracket and then attached to a complementary mating bracket of another height-adjustable table without the use of tools. This feature allows the users to reconfigure or reposition the tables in a different arrangement, e.g. non-sequential arrangement, within the office space.

DETAILED DESCRIPTION

Figure 1:
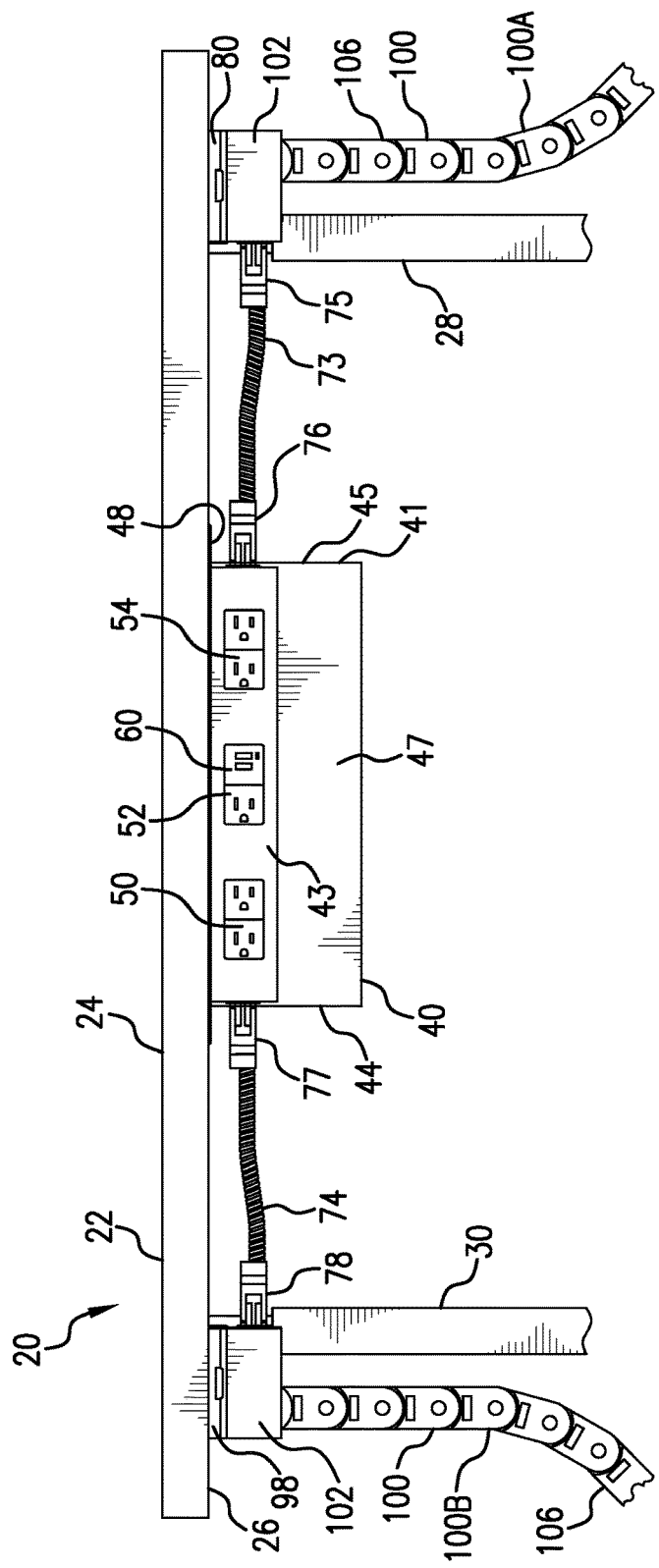
FIG. 1 is a rear elevational view of a height-adjustable table with a flexible electrical power distribution cable assembly in accordance with one embodiment of the invention.
Figure 2:
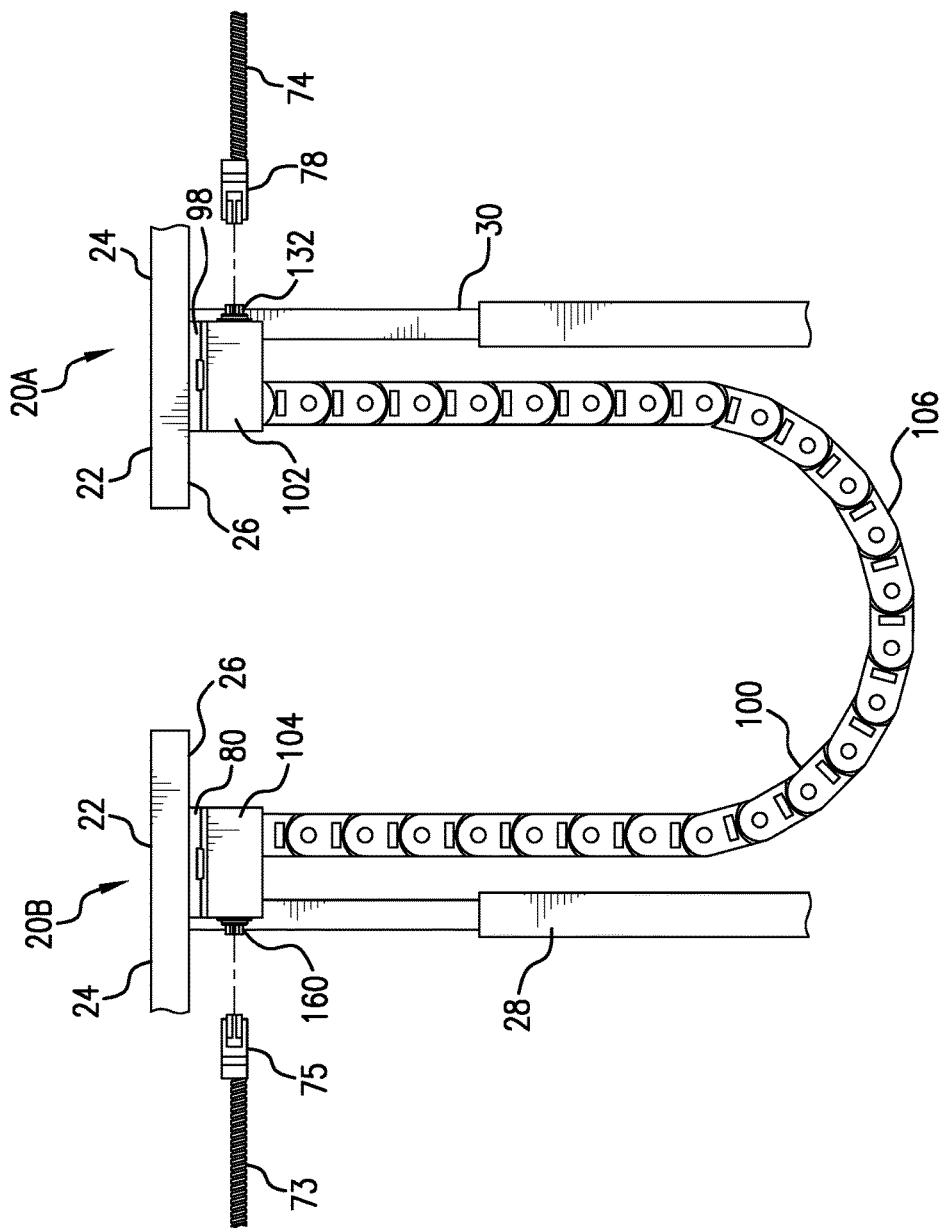
FIG. 2 is a partial, elevational view of a pair of height-adjustable tables arranged in a daisy-chain configuration with a flexible electrical power distribution cable assembly in accordance with another embodiment of the invention.

Referring to FIG. 1, there is shown height-adjustable table 20 in accordance with one embodiment of the invention. Table 20 comprises table top 22 which has top surface 24 and bottom surface 26. Top surface 24 is the work surface. Table 20 further comprises height-adjustable legs 28 and 30, which are partially shown in FIG. 1. Table 20 further comprises electrical power hub device 40 that is attached to the underside or bottom surface 26. Referring to FIGS. 1 and 7-12, electrical power hub device 40 comprises housing 41. Housing 41 comprises rear wall section 42 and a utility receptacle box 43 which is attached to rear wall section 42. Housing 41 further comprises sidewall sections 44 and 45 which are attached to and extend from rear wall section 42. Housing 41 includes door 47 that is movably or pivotably attached to sidewall sections 44 and 45. Door 47 has a handle 47A. Receptacle box 43 includes a top section 48 that is configured to be removably attached to bottom surface 26 of table 20 by inserting fasteners (e.g. screws) through through-holes 48A. Housing 41 includes bracket sections having through-holes 41A that serve the same purpose as through-holes 48A. Utility receptacle box 43 includes electrical power receptacles (e.g. 110-120 VAC) 50, 52 and 54 and USB device charging ports 60. Utility receptacle box 43 also includes USB voltage converter circuitry that converts 110-120 VAC to a DC voltage that is used to charge devices such as smart phones, iPads, etc. This DC voltage is provided to the USB device charging ports 60. In some embodiments, electrical power hub device 40 includes connectors and ports for Ethernet cables, telephone wires and other data cables. Utility receptacle box 43 includes electrical connectors 71 and 72 that are mounted to the sidewalls of utility receptacle box 43. The electrical connectors 71 and 72 are electrically connected to the internal wiring of utility receptacle box 43. This internal wiring is electrically connected to the utility receptacles 50, 52 and 54, and the USB voltage converter circuitry. Since electrical power hub device 40 is attached to bottom surface 26 of table 20, the electrical power hub device 40 moves upward with table top 22 when the height of table 20 is raised and also moves downward with table top 22 when the height of table 20 is lowered.

Electrical power hub device 40 includes storage compartment 70 to manage and store all the power cords and cables so as to prevent these cords and cables from becoming tangled under table 20. Such a feature prevents damage to these power cords and cables during use of table 20. A user can plug the electrical power cords for his or her computer or computer screen, or other equipment, into electrical power receptacles 50, 52 and 54 in electrical power hub device 40. A secondary power extension cord or strip may also be plugged into one of the electrical power receptacles 50, 52 and 54. The user may plug his or her cell phone charging cable into one of the USB charging ports 60. All excess portions of electrical power cords, cables and cell phone cords can be neatly wrapped up and stored in storage compartment 70. Therefore, all excess portions of the cables and cords will also move upward with table top 22 as the height of table 20 is raised and will move downward with table top 22 as the height of table 20 is lowered.

Figure 9:
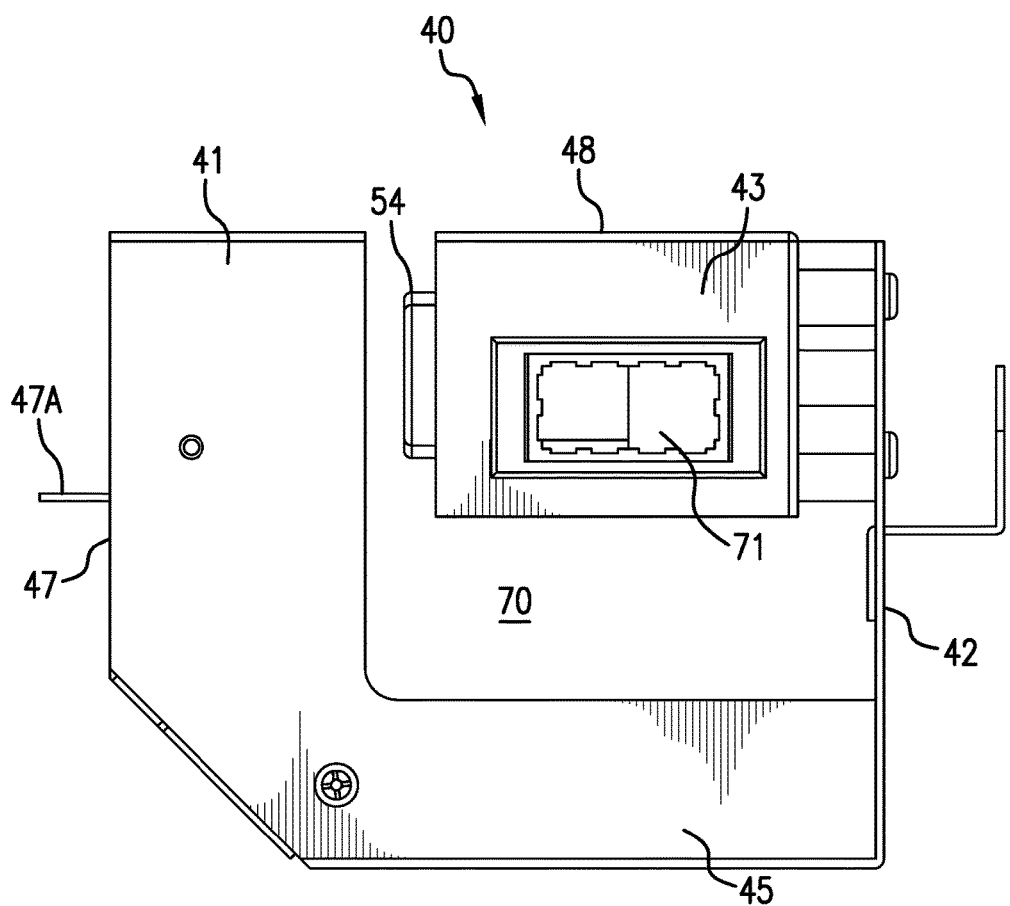
FIG. 9 is a side view of the electrical power hub device with the door in the closed position.
Figure 10:
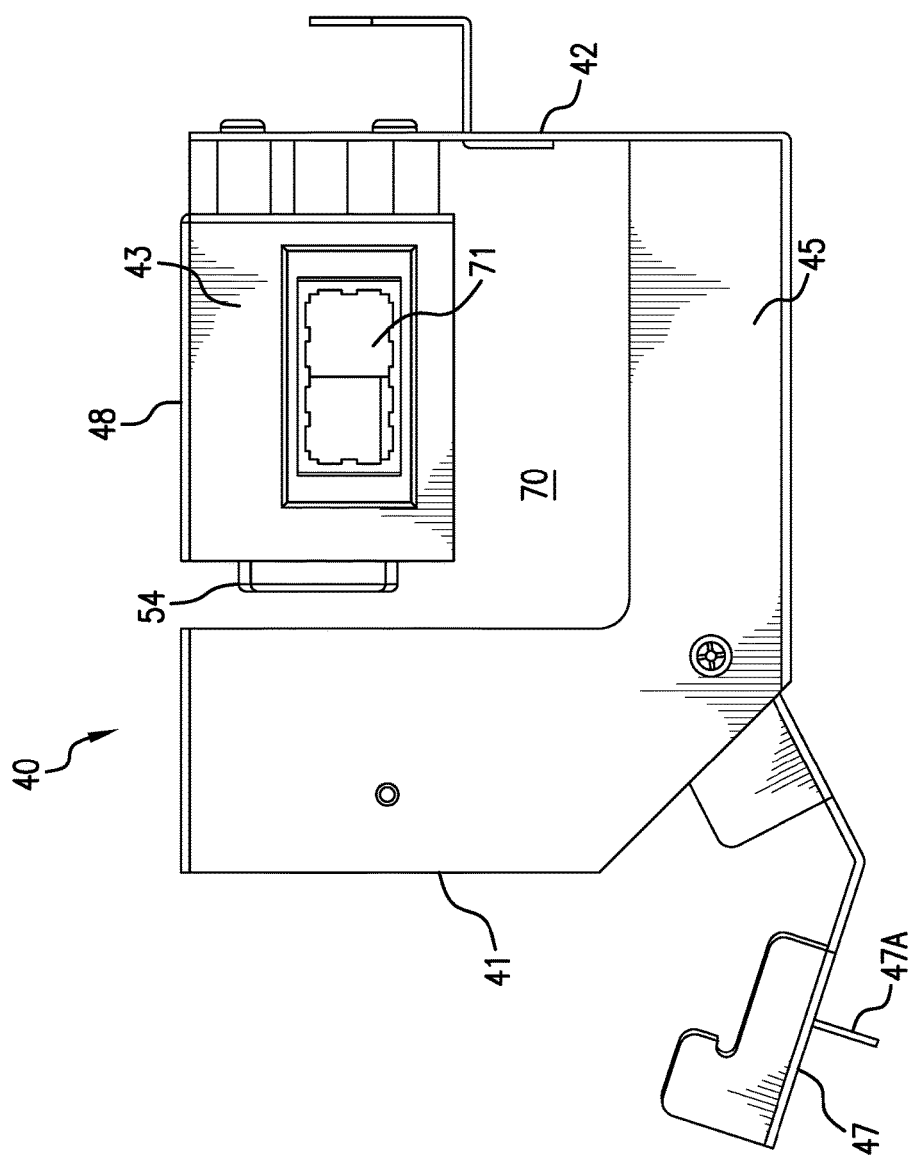
FIG. 10 is a side view of the electrical power hub device with the door in the open position
Figure 11:
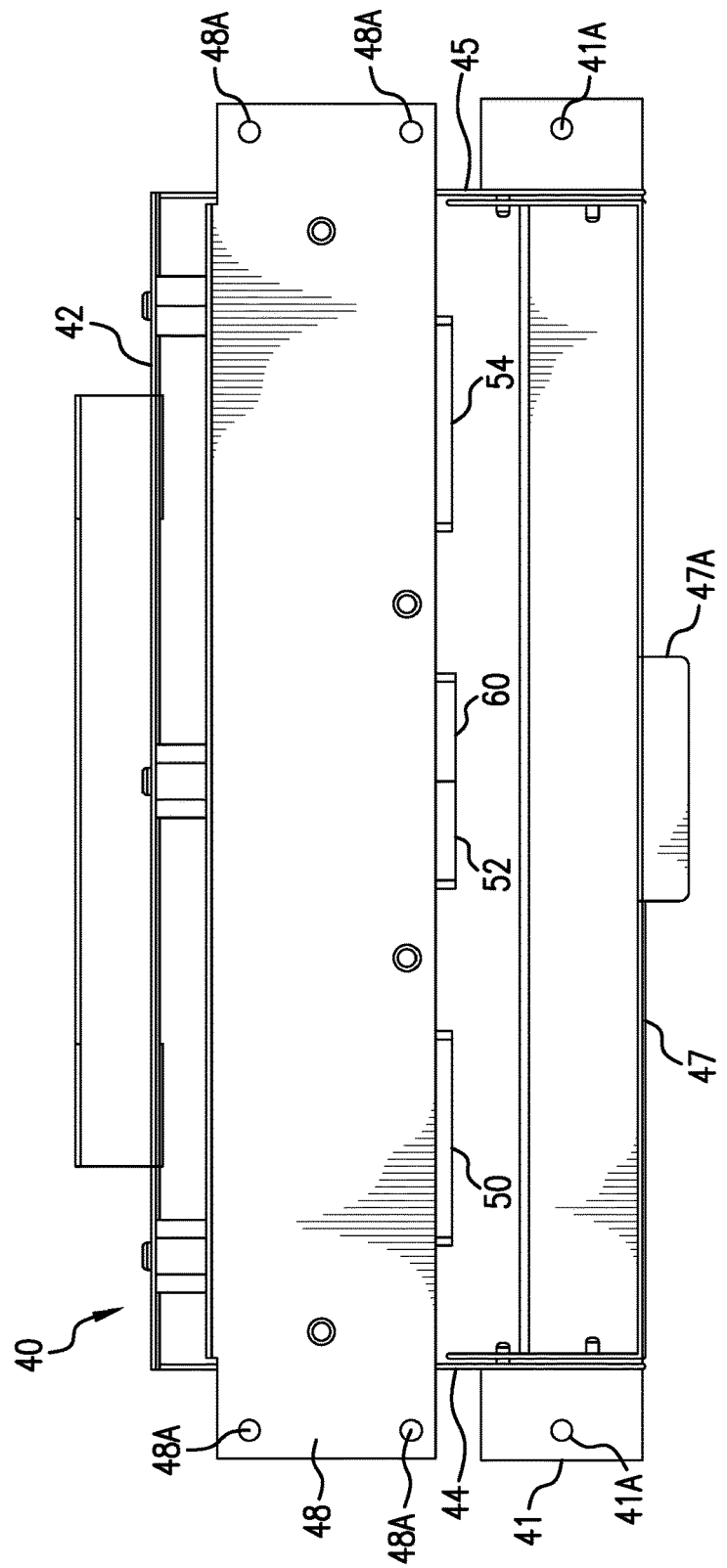
FIG. 11 is a top view of the electrical power hub device with the door in the closed position.
Figure 12:
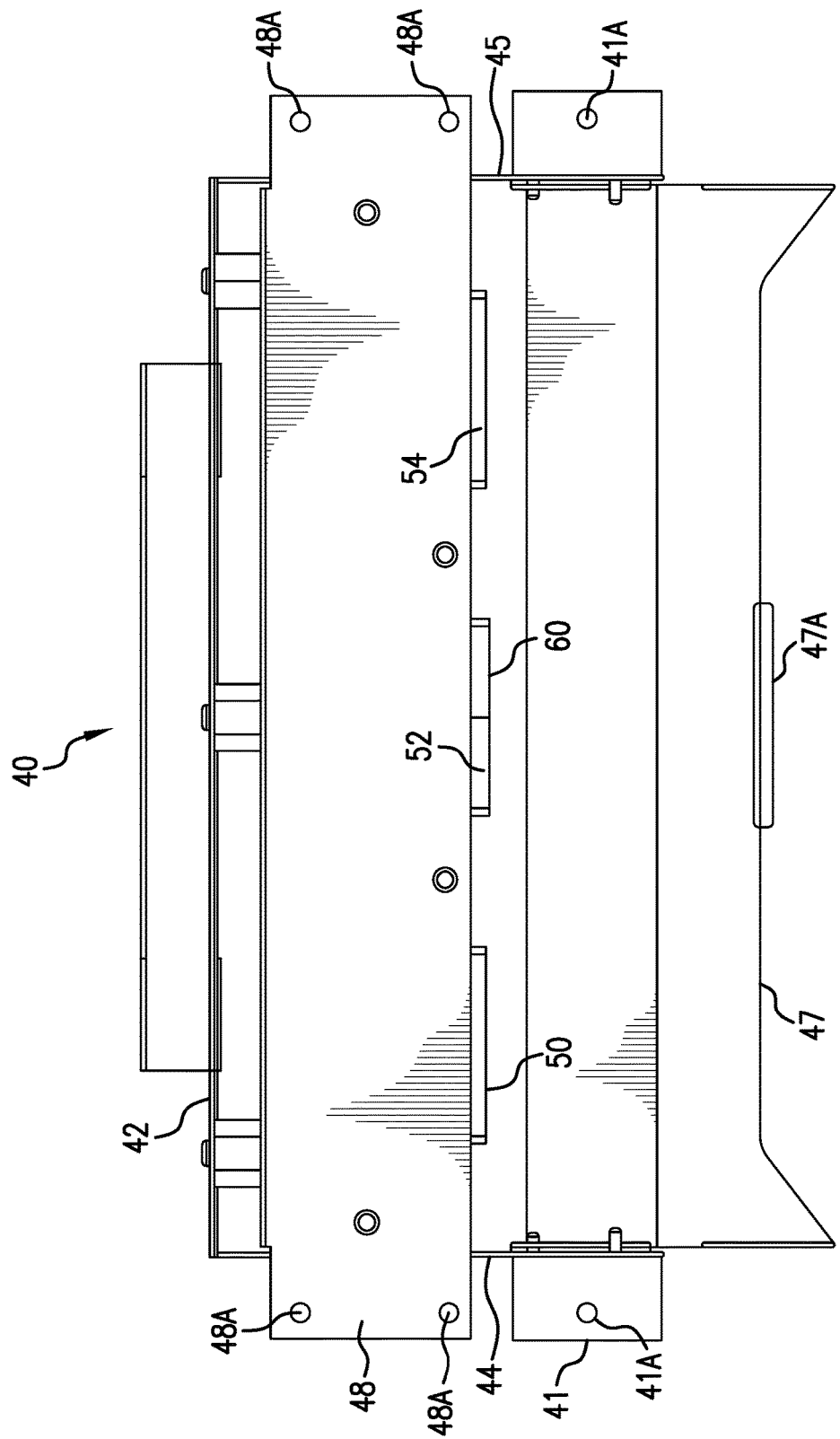
FIG. 12 is a top view of the electrical power hub device with the door in the open position.

Referring to FIGS. 1, 9 and 10, electrical power hub device 40 further comprises a pair of power hub cables 73 and 74. Power hub cable 73 has electrical connector 75 at one end and electrical connector 76 at the opposite end. Electrical connector 76 is electrically connected to electrical connector 71. Similarly, power hub cable 74 has electrical connector 77 at one end and electrical connector 78 at the opposite end. Electrical connector 77 is electrically connected to electrical connector 72. The purpose of power hub cables 73 and 74 is discussed in the ensuing description.

Referring to FIGS. 1, 3A-E, table 20 includes a complementary mating bracket or connector 80 that is attached to bottom surface 26 of table 20. Mating bracket 80 has a structure that is complementary to the structure of electrical interface connector 102 of flexible electrical power distribution cable assembly 100 (see FIGS. 1, 3A, 3E, 4D and 4E). Such a configuration allows electrical interface connector 102 to be removably secured to mating bracket 80. Mating bracket 80 has central section 82, rear section 83 and overhanging sections 86 and 87 which are contiguous with central section 82. Overhanging section 86 comprises substantially vertical section 88 and a substantially horizontal section 89. Overhanging section 86 has a lengthwise slot 90 that is located at the junction of vertical section 88 and horizontal section 89. Substantially vertical section 88 and a substantially horizontal section 89 define channel 91. Similarly, overhanging section 87 comprises a substantially vertical section 93 and a substantially horizontal section 94. Overhanging section 87 has a lengthwise slot 95 that is located at the junction of vertical section 93 and horizontal section 94. Substantially vertical section 93 and substantially horizontal section 94 define channel 96. Table 20 further includes mating bracket or connector 98 which has a structure that is identical to mating bracket 80. Mating bracket 98 is attached to bottom surface 26 of table 20 and positioned at the opposite end of table 20.

Figure 3A:
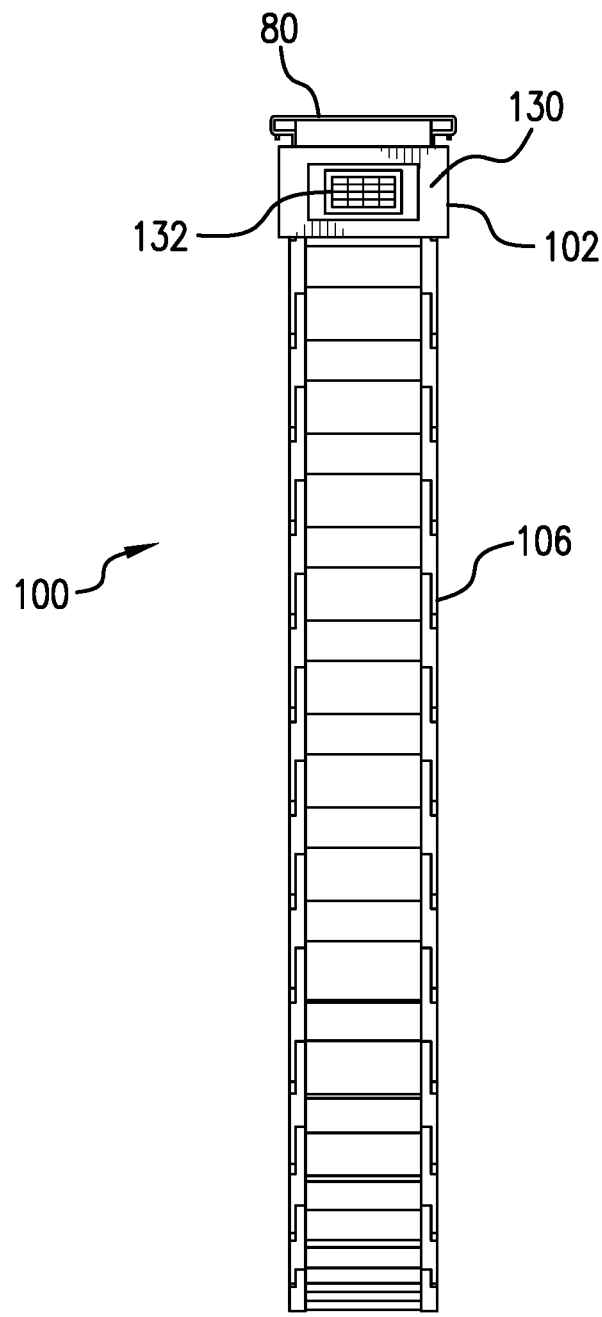
FIG. 3A is a front elevational view of the flexible electrical power distribution cable assembly, shown in FIGS. 1 and 2, the flexible electrical power distribution cable assembly having an electrical interface connector removably secured to a complementary mating bracket that is configured to be attached to the underside of the height-adjustable table.
Figure 3B:
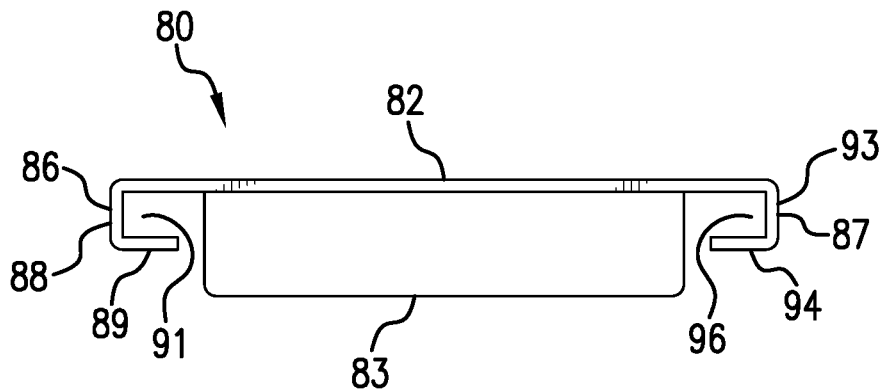
FIG. 3B is an end view of the complementary mating bracket shown in FIG. 3A.
Figure 3C:
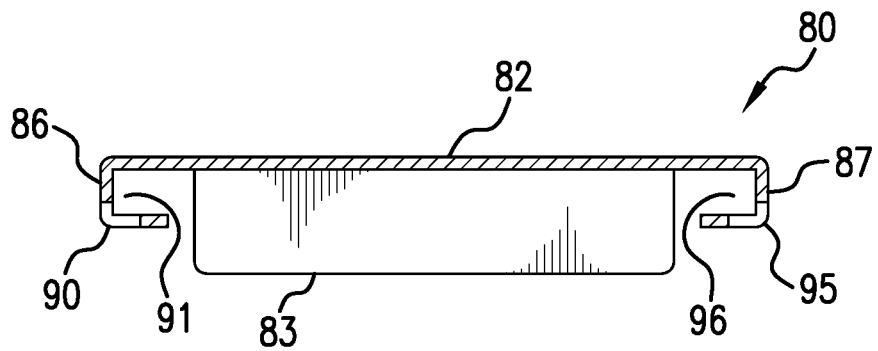
FIG. 3C is an end view, partially in cross-section, of the complementary mating bracket.
Figure 3D:
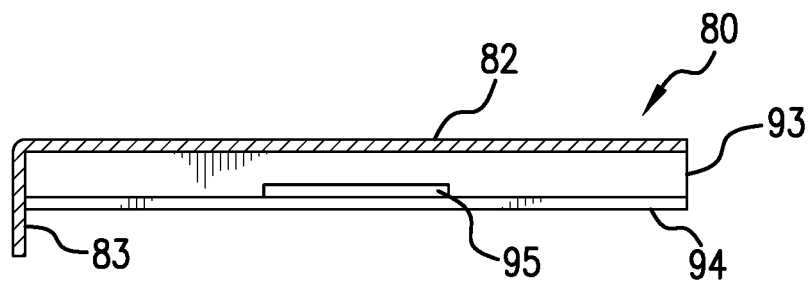
FIG. 3D is a side view, in cross-section, of the complementary mating bracket.
Figure 3E:
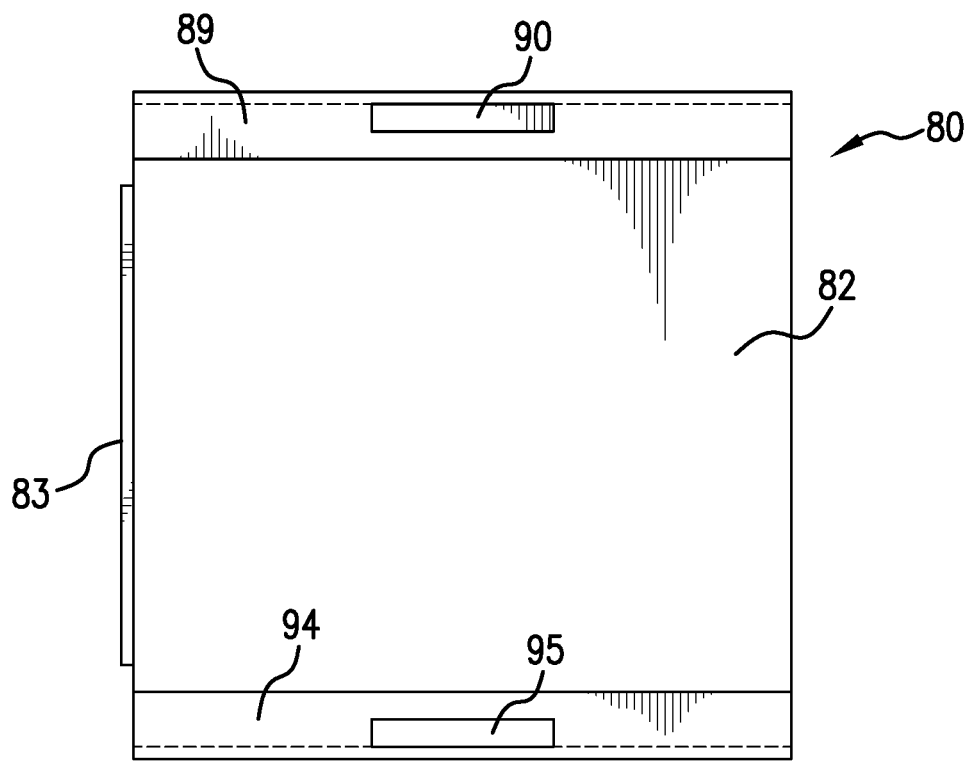
FIG. 3E is a bottom view of the complementary mating bracket.
Figure 4A:
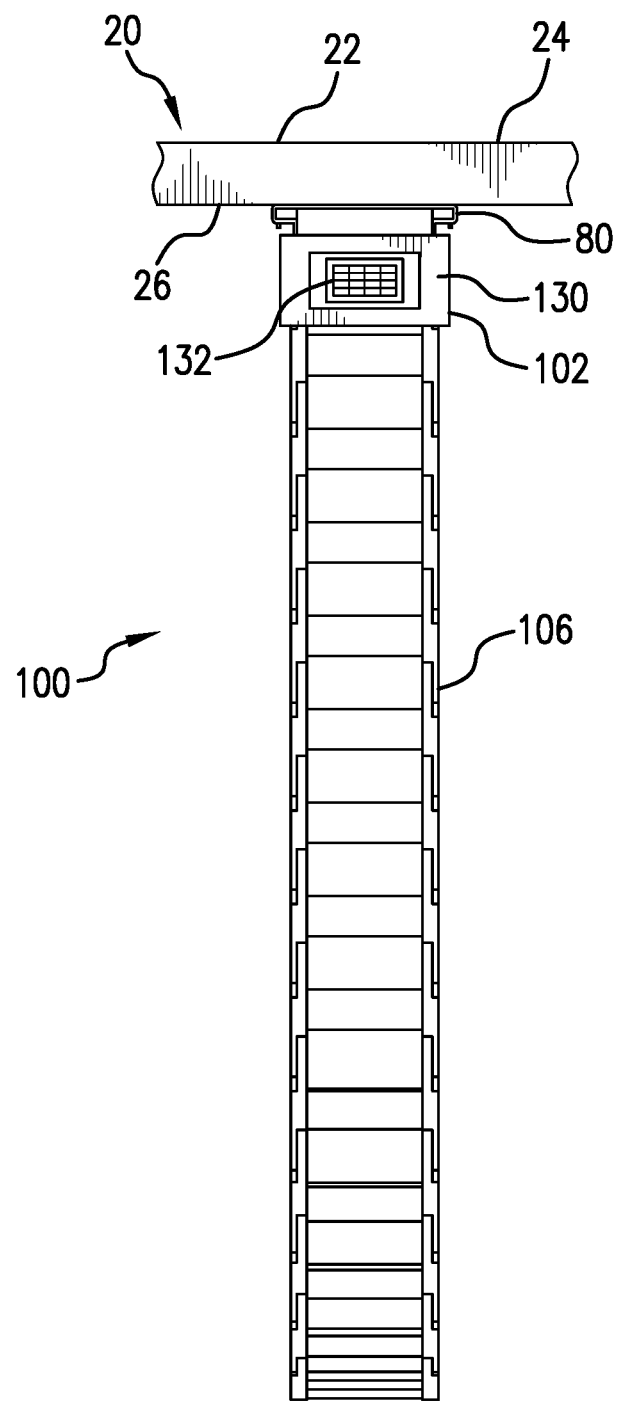
FIG. 4A is an elevational view showing the complementary mating bracket attached to the underside of the height-adjustable table and the electrical interface connector removably connected to the complementary mating bracket.
Figure 4C:
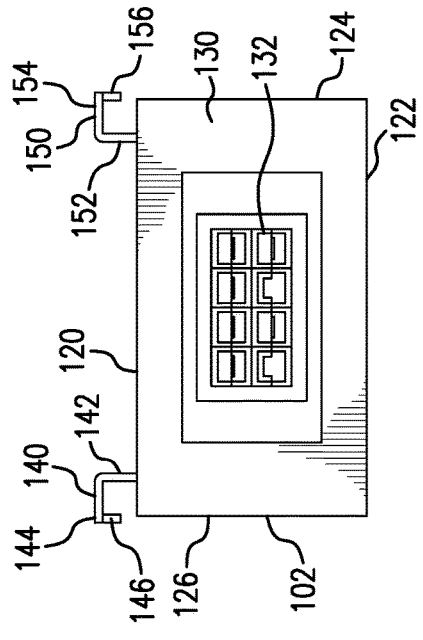
FIG. 4C is a front view of the electrical interface connector.
Figure 4E:
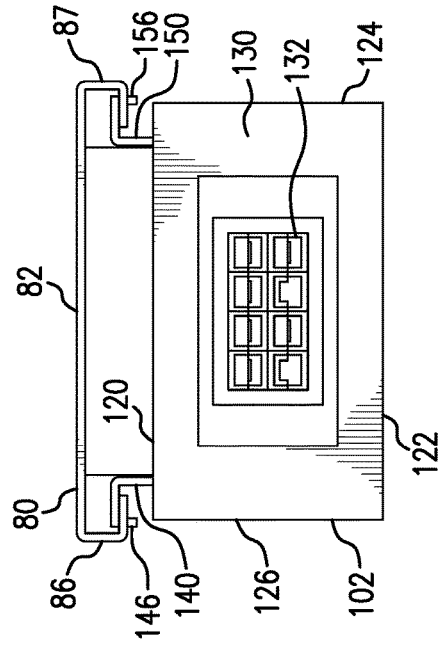
FIG. 4E is a front end showing the electrical interface connector removably secured to the complementary mating bracket.

Referring to FIGS. 1, 3A, 4C, electrical power is delivered to table 20 via a flexible electrical power distribution cable assembly 100. Cable assembly 100 has electrical interface connector 102 at one end and electrical interface connector 104 at the opposite end. Electrical interface connector 102 and electrical interface connector 104 are identical in construction and have the same function. Flexible electrical power distribution cable assembly 100 further comprises flexible chain-like harness 106 attached to electrical interface connectors 102 and 104. Electrical cables or wires are secured within flexible chain-like harness 106. In other embodiments, data and telephony cables and wires are also secured within flexible chain-like harness 106. In one embodiment, flexible electrical power distribution cable 100 is the commercially available IGUS® Chainflex® power cable manufactured by IGUS, Inc. of East Providence, R.I.

Figure 4B:
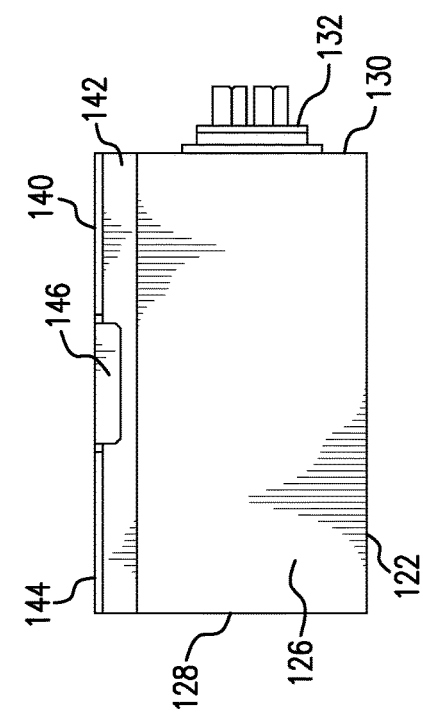
FIG. 4B is a side view of the electrical interface connector shown in FIG. 3A.
Figure 4D:
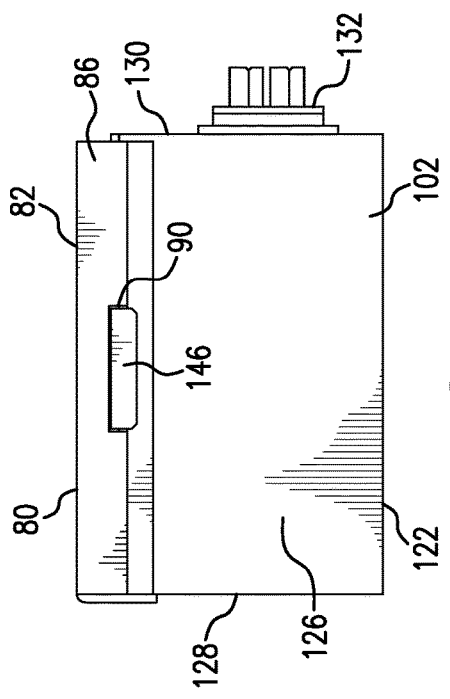
FIG. 4D is a side view showing the electrical interface connector removably secured to the complementary mating bracket.

Referring to FIGS. 4B and 4C, there is shown electrical interface connector 102. In order to facilitate understanding of electrical interface connector 102 and to simplify the drawings, flexible chain-like harness 106 is not shown in FIGS. 4B, 4C and 4E. Electrical interface connector 102 has a structure that is configured so that electrical interface connector 102 can be removably secured to corresponding mating bracket 80. Mating bracket 80 has a structure that is complementary to the structure of electrical interface connector 102. Electrical interface connector 102 comprises top section 120, bottom section 122, sidewall 124, sidewall 126 and rear section 128. Electrical interface connector 102 further comprises front section 130 and electrical connector ports 132 which extend from front section 130. Electrical connector ports 132 are configured to mate with electrical connector 75 of power hub cable 73. Electrical interface connector 102 further comprises lengthwise extending rails 140 and 150 which are attached to top section 120. Rails 140 and 150 are identical in construction. Rail 140 comprises substantially vertical section 142 and substantially horizontal section 144. Rail 140 further comprises downwardly extending section or tongue 146 that is attached to substantially horizontal section 144. Tongue 146 is sized and shaped to fit in slot 90 of overhanging section 86 of mating bracket 80. Rail 140 is sized and shaped to slide through channel 91 of overhanging section 86. Similarly, rail 150 comprises substantially vertical section 152 and substantially horizontal section 154. Rail 150 further comprises downwardly extending section or tongue 156 that is attached to substantially horizontal section 154. Tongue 156 is sized and shaped to fit into slot 95 of overhanging section 87 of mating bracket 80. Rail 150 is sized and shaped to slide through channel 96 of overhanging section 87.

Electrical interface connectors 102 and 104 are identical in construction and function in the same manner. Electrical interface connector 104 includes electrical connector ports 160 that function in the same manner as electrical connector ports 132.

Referring to FIGS. 4B, 4C, 4D, 4E and 6, in order to connect the electrical interface connector 102 to mating bracket 80, the user positions electrical interface connector 102 so that rails 140 and 150 are aligned with channels 91 and 96, respectively. The user then maneuvers electrical interface connector 102 so that rails 140 and 150 enter channels 91 and 96, respectively. The user then pushes electrical interface connector 102 so that rails 140 and 150 slide through channels 91 and 96, respectively, until tongue 146 slips into slot 90 and tongue 156 slips into slot 95 (see FIGS. 4D and 4E). Once electrical interface connector 102 is secured to mating bracket 80, connector 75 of power hub cable 73 may be electrically connected to electrical connector ports 132 of electrical interface connector 102.

In order to remove electrical interface connector 102 from mating bracket 80, the user raises or lifts electrical interface connector 102 so that tongues 146 and 156 are withdrawn from slots 90 and 95, respectively. The user then pulls electrical interface connector 102 outward so that rails 140 and 150 exit channels 91 and 96, respectively.

In accordance with another embodiment of the invention, a plurality of tables 20 can be daisy-chained together with a plurality of identically constructed flexible electrical power distribution cable assemblies 100. In such a configuration, only one of these flexible power cable assemblies 100 need be connected to a source of electrical power. Such a configuration is shown in FIGS. 1, 2, 5A, 5B and 5C. In FIG. 1, table 20 is used with two identically constructed flexible power distribution cable assemblies 100, referred to by reference numbers 100A and 100B. The electrical interface connector 102 of cable assembly 100A is removably secured to mating bracket 80. Similarly, electrical interface connector 102 of cable assembly 100B is removably secured to mating bracket 98. Cable assembly 100A delivers electrical power from either another height-adjustable table, identical to table 20, or an electrical power source, such as an electrical power receptacle in the floor or wall. Connector 75 of power hub cable 73 is electrically connected to electrical interface connector 102. Connector 76 of power hub cable 73 is electrically connected to electrical connector 71 of utility receptacle box 43. Hence, power hub cable 73 delivers the electrical power to the utility receptacle box 43. This electrical power is available at electrical power receptacles 50, 52 and 54, and USB device charging port 60. Power hub cable 74 is electrically connected to the electrical connector 72 of utility receptacle box 43 and electrical interface connector 102 of cable assembly 100B. Power hub cable 74 delivers the electrical power to electrical interface connector 102 of cable assembly 100B. Cable assembly 100B then provides the electrical power to the next height-adjustable table (not shown) in the daisy-chain arrangement. This is further illustrated in FIG. 2 wherein two identical height-adjustable tables 20, indicated by reference numbers 20A and 20B, are arranged in a daisy-chain arrangement. Power hub cable 74 of table 20A is electrically connected to electrical connection ports 132 of electrical interface connector 102. Cable assembly 100 then delivers the electrical power to table 20B. Specifically, electrical interface connector 104 is electrically connected to electrical connector 75 of hub cable 73. Similarly, another cable assembly, not shown but identical in construction to cable assembly 100, delivers electrical power to another table 20 (not shown) in the daisy-chain. Thus, a plurality of tables 20 may be used in such a daisy-chain configuration. Only the first or last cable assembly 100 is configured to be connected to a source of electrical power, e.g. electrical power receptacle in the floor or wall.

Figure 5C:
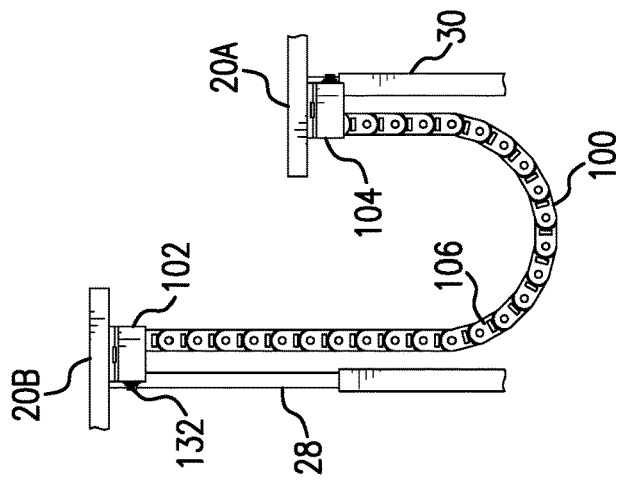
FIGS. 5A-C is are partial, elevational views of pairs of height-adjustable tables arranged in a daisy-chain configuration wherein a flexible electrical power cable assembly is electrically connected to each table and each table may be adjusted in height independent of the other table without interruption in electrical connectivity.
Figure 5B:
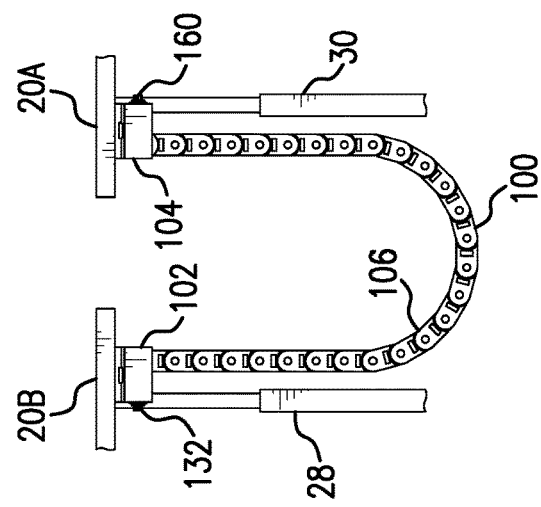
Figure 5A:
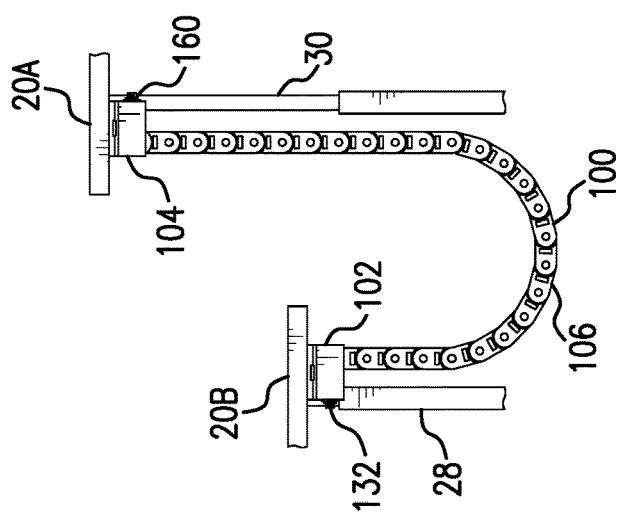
Figure 6:
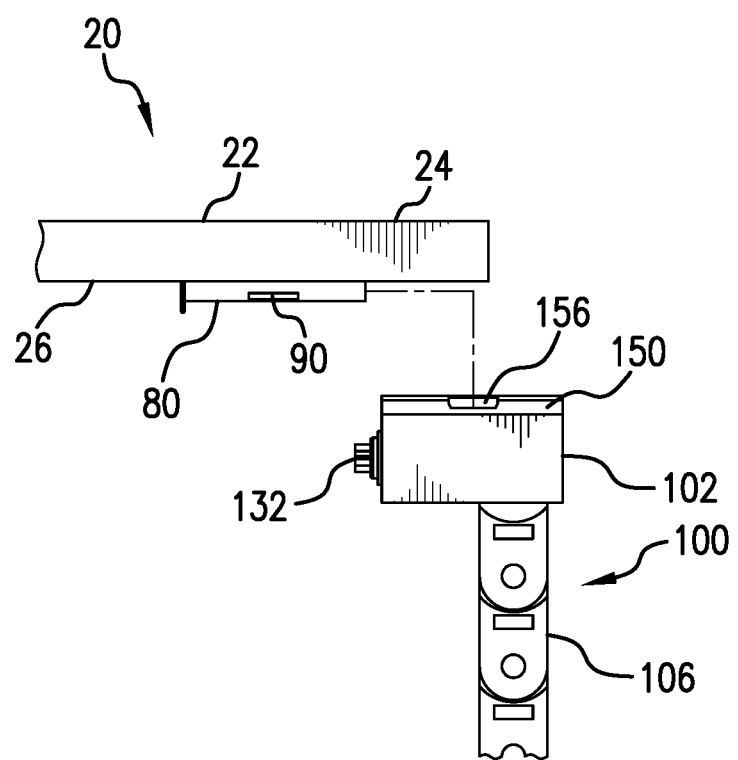
FIG. 6 is a partial, side elevational view showing how the electrical interface connector of the flexible electrical power cable assembly is removably secured to the complementary mating bracket.
Figure 7:
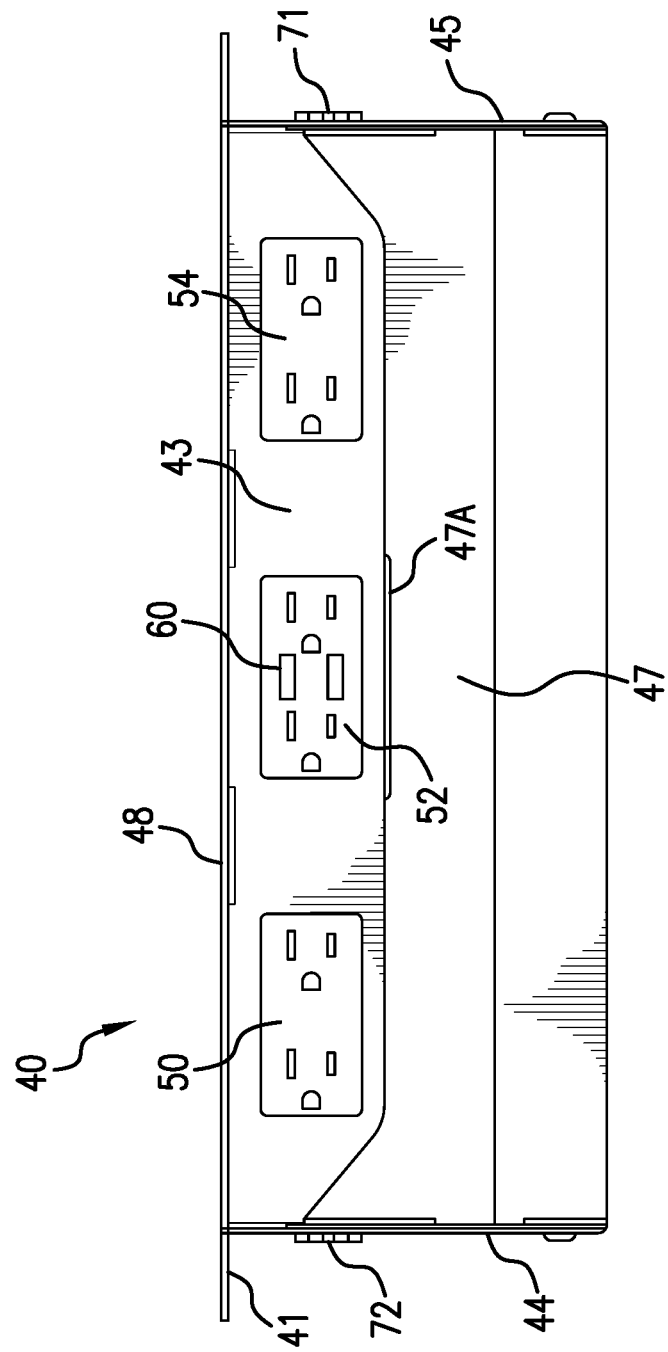
FIG. 7 is a front view of an electrical power hub device shown in FIG. 1, the view showing a door of the electrical power hub device in a closed position.
Figure 8:
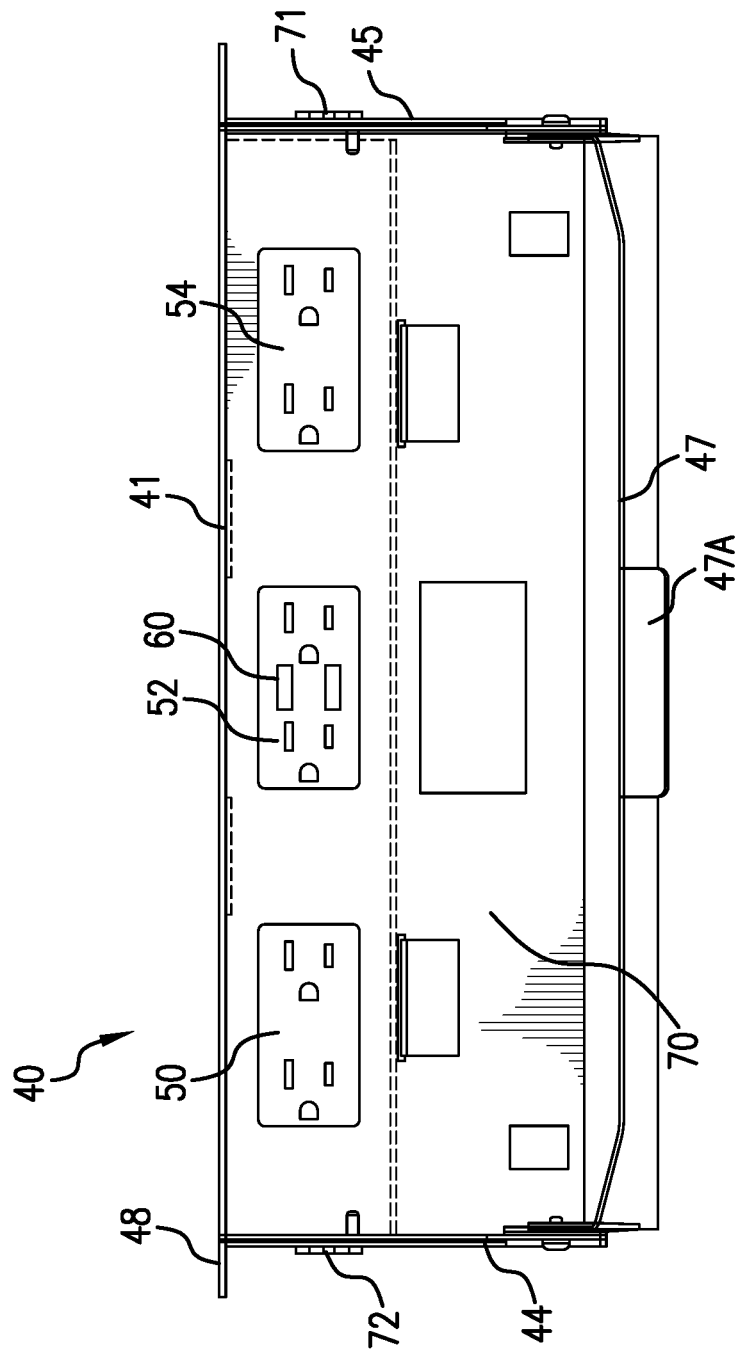
FIG. 8 is a front view of the electrical power hub device with the door in an open position.

As shown in FIGS. 5A-C, the flexibility of cable assembly 100 allows the height of each table 20 to be raised or lowered independent of the other tables 20 in the daisy-chain configuration without causing any type of interruption in electrical connectivity.

Figure 13:
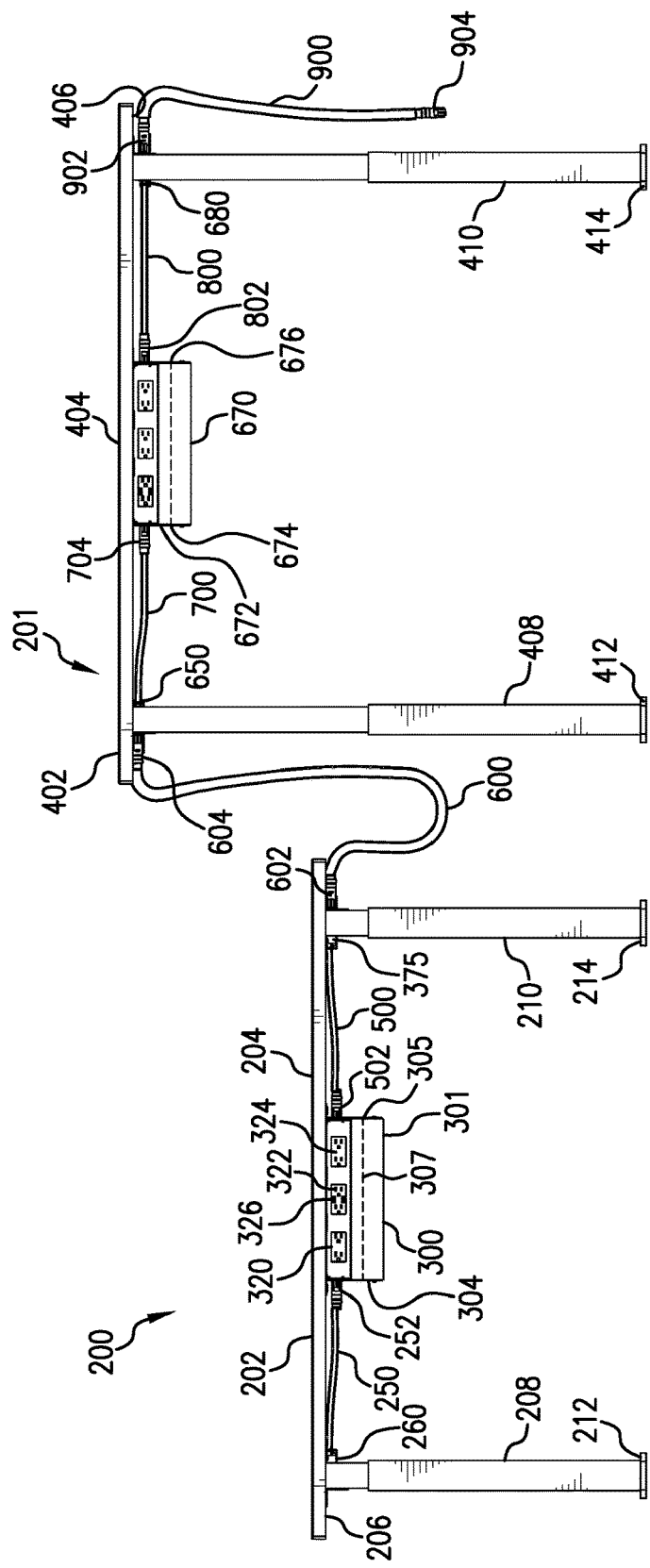
FIG. 13 is a rear elevational view of height adjustable tables electrically connected together with flexible electrical power distribution cables in accordance with another embodiment of the present invention.
Figure 14:
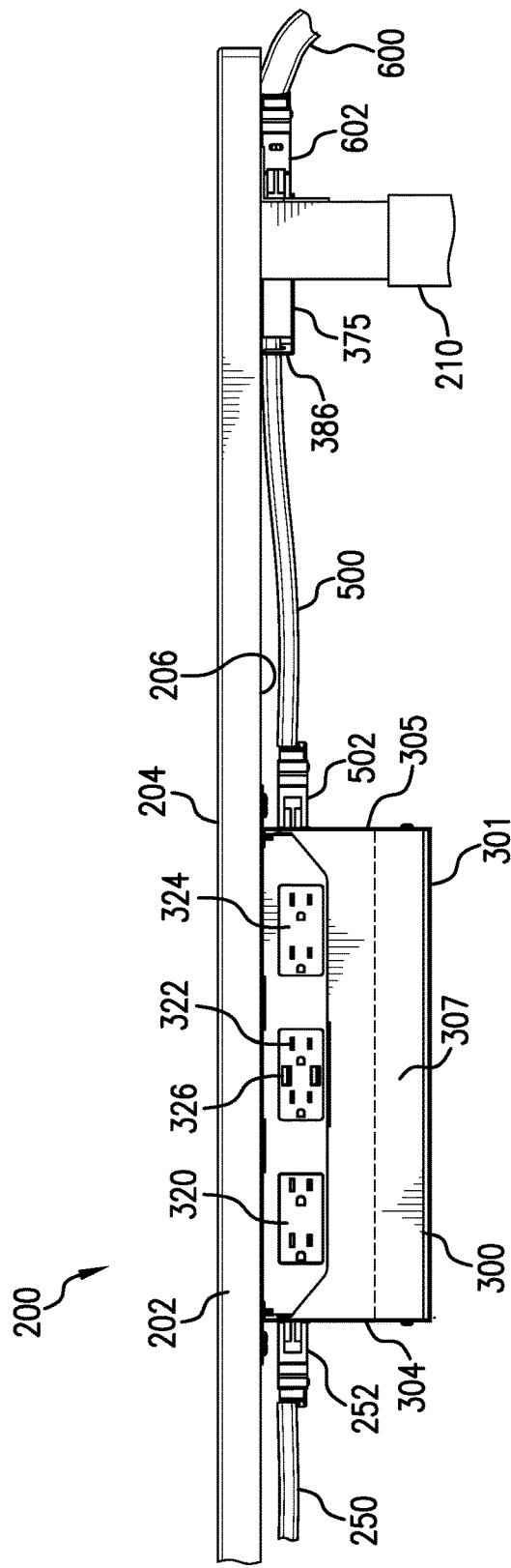
FIG. 14 is an enlarged view of a portion of the view shown in FIG. 13.
Figure 15:
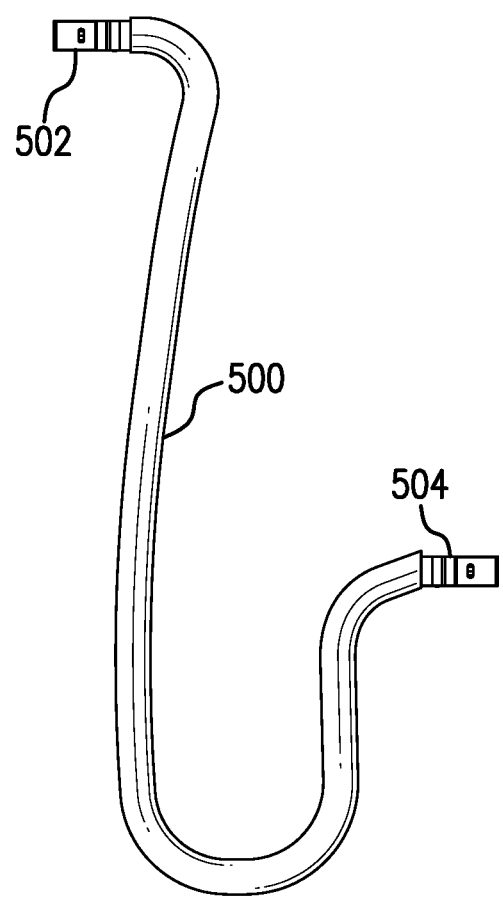
FIG. 15 is a side elevational view of an electrical power cable shown in FIG. 13.
Figure 16:
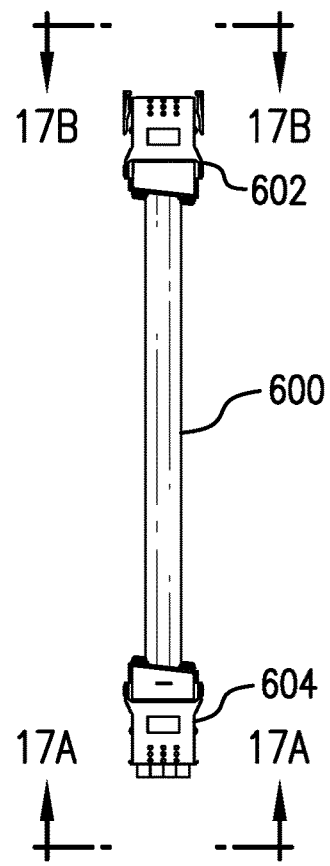
FIG. 16 is a top plan view of another electrical power cable shown in FIG. 13.
Figure 17A:
FIG. 17A is an end view taken along line 17A-17A of FIG. 16.
Figure 17B:
FIG. 17B is an end view taken along line 17B-17B of FIG. 16.
Figure 18:
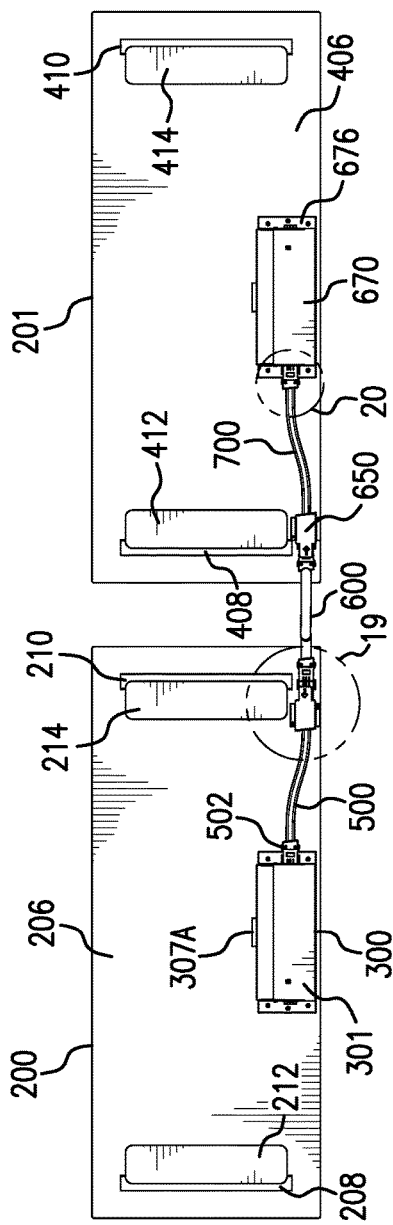
FIG. 18 is a bottom view of the height adjustable tables shown in FIG. 13, the view showing the arrangement and connection of the electrical power cables shown in FIGS. 15 and 16.
Figure 20:
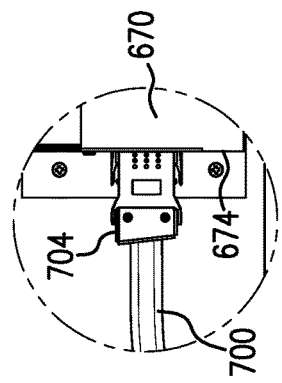
FIG. 20 is an enlarged view of a portion of the view shown in FIG. 18.
Figure 19:
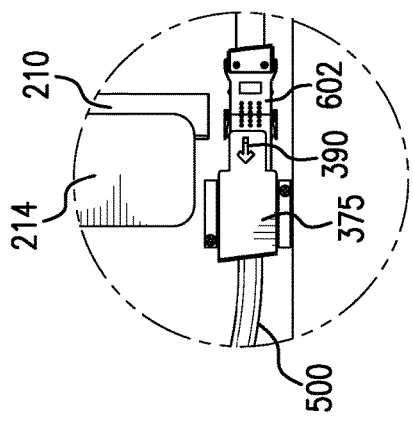
FIG. 19 is an enlarged view of a portion of the view shown in FIG. 18.
Figure 21:
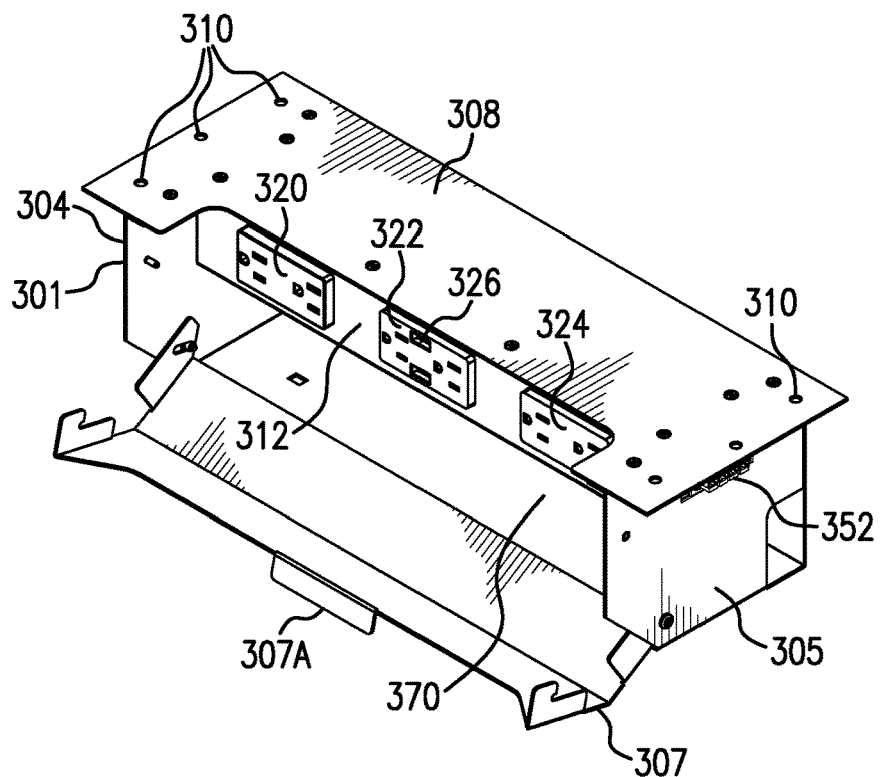
FIG. 21 is a perspective view of an electrical power center shown in FIG. 13, the view showing a front door of the electrical power center in an open position.
Figure 22:
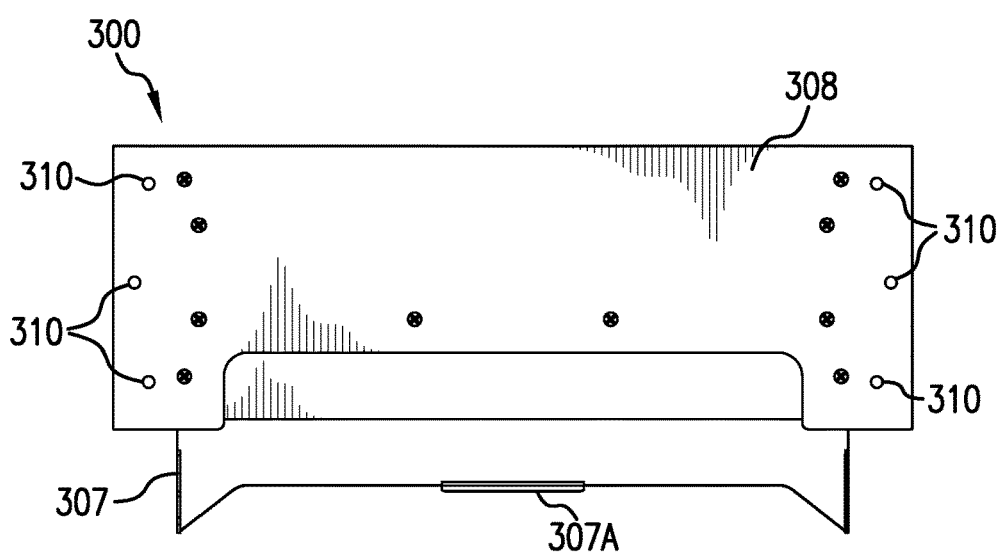
FIG. 22 is a top plan view of the electrical power center shown in FIG. 21.
Figure 23:
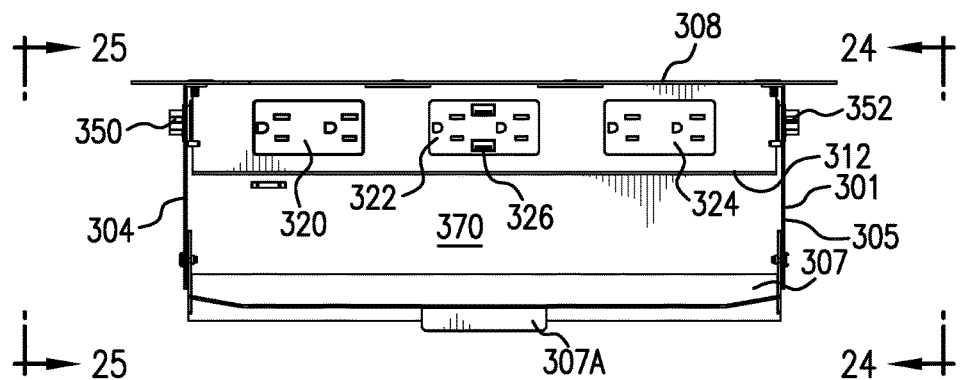
FIG. 23 is a front view of the electrical power center shown in FIG. 21.
Figure 24:
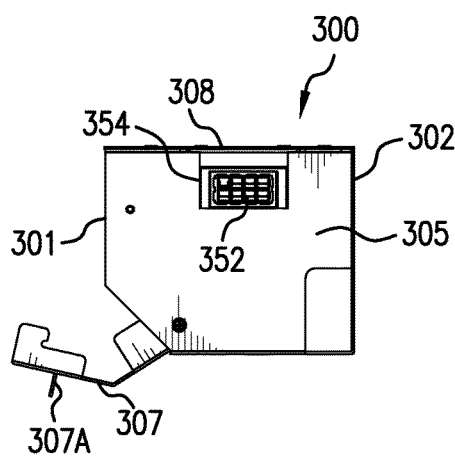
FIG. 24 is an end view of the electrical power center taken along line 24-24 in FIG. 23.
Figure 25:
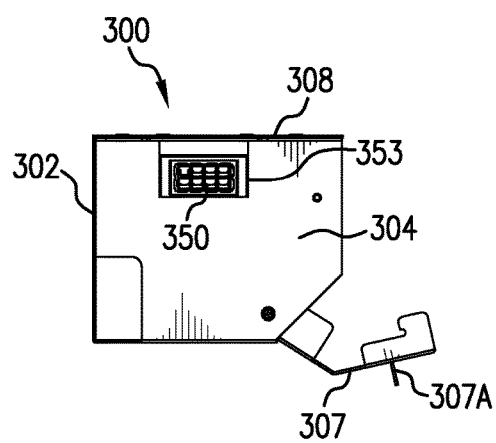
FIG. 25 is an end view of the electrical power center taken along line 25-25 of FIG. 23.
Figure 26:
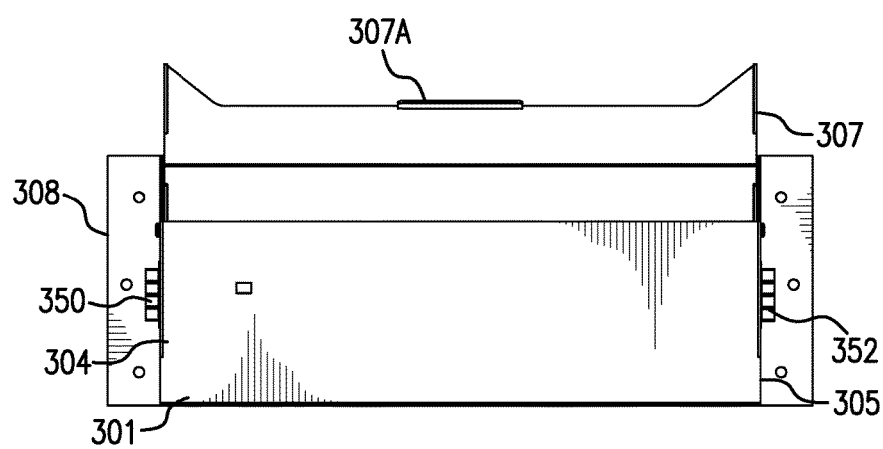
FIG. 26 is a bottom view of the electrical power center of FIG. 23.
Figure 27:
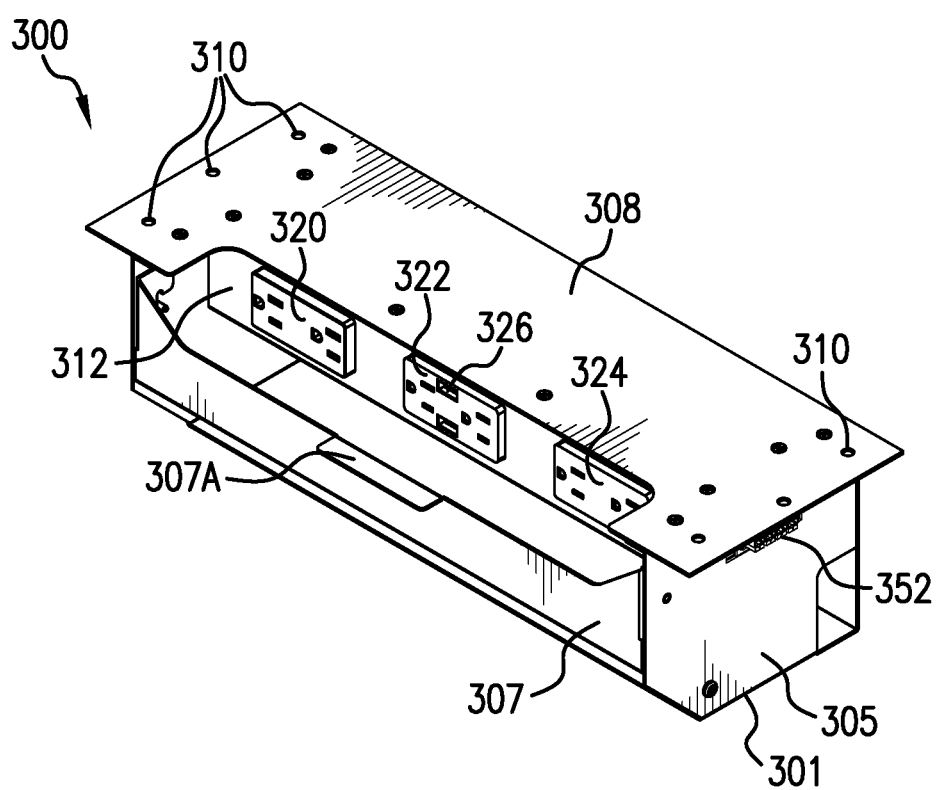
FIG. 27 is a perspective view of the electrical power center shown in FIG. 23, the view showing the front door in a closed position.
Figure 28:
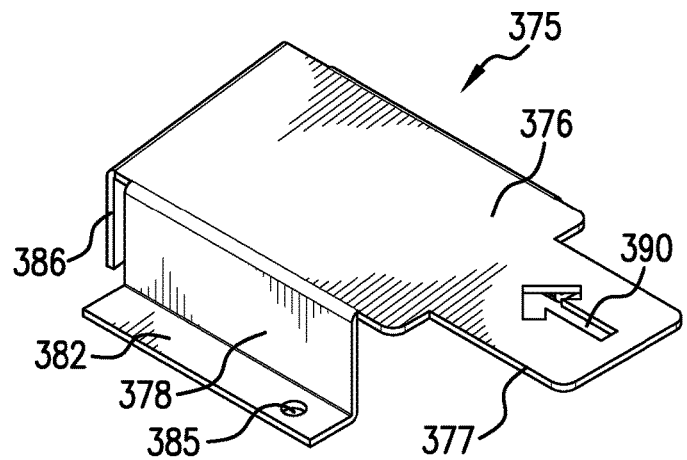
FIG. 28 is a perspective view of a bracket shown in FIGS. 13, 14, 18 and 19.
Figure 29:
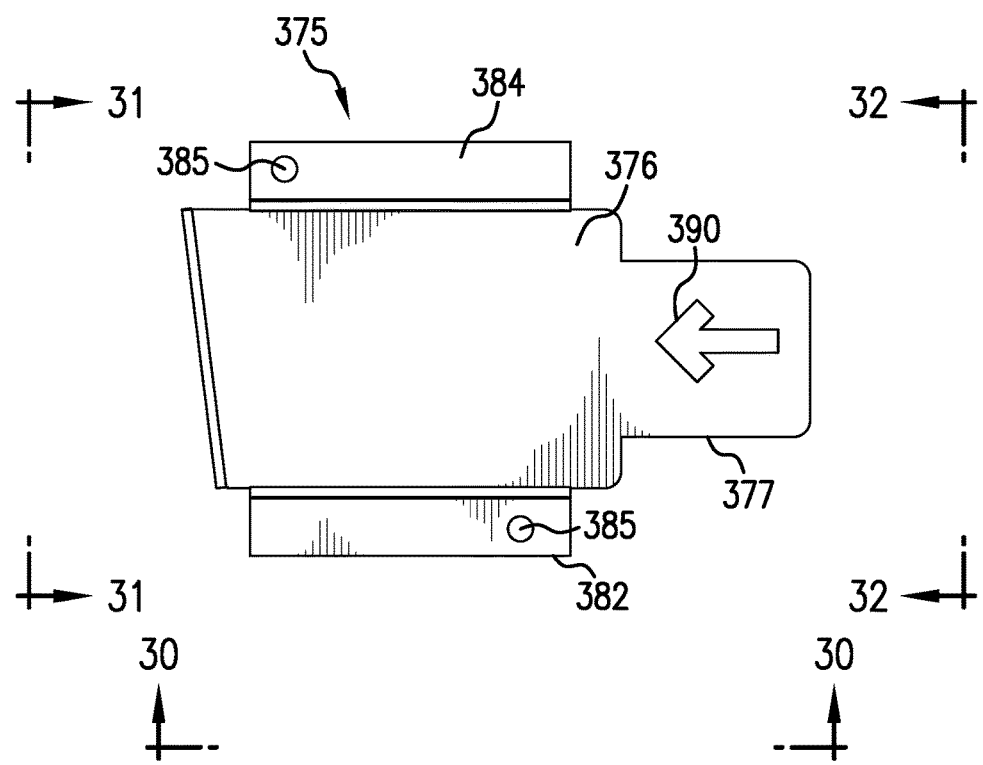
FIG. 29 is a top view of the bracket shown in FIG. 28.
Figure 30:
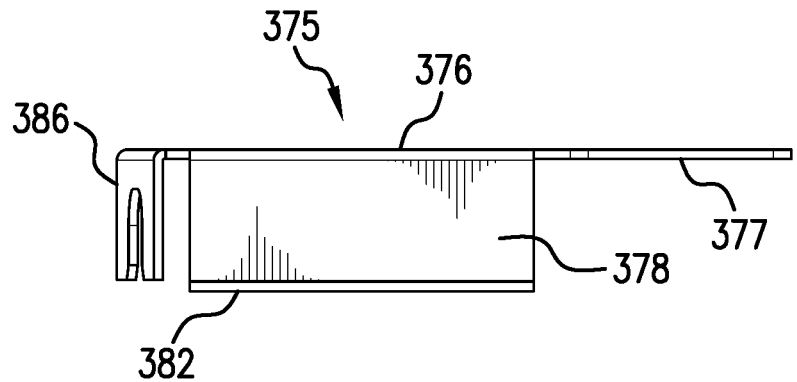
FIG. 30 is a side view taken along line 30-30 of FIG. 29.
Figure 31:
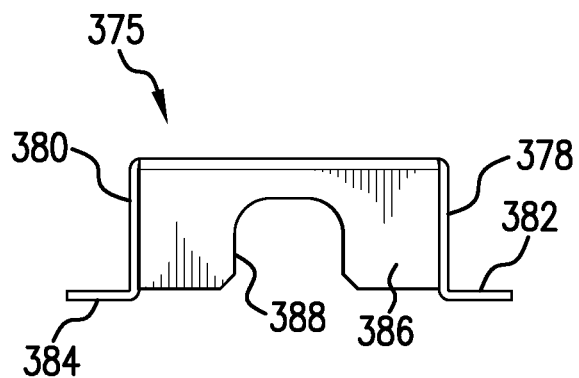
FIG. 31 is an end view taken along line 31-31 of FIG. 29.
Figure 32:
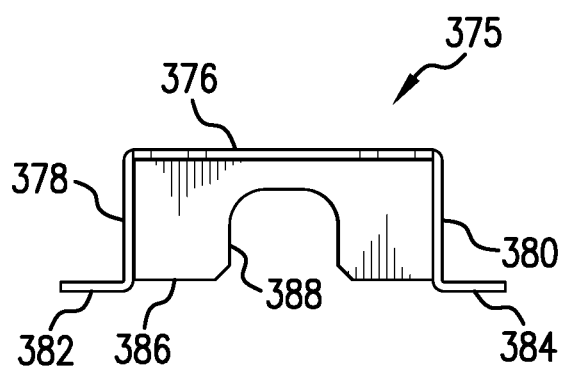
FIG. 32 is an end view taken along line 32-32 of FIG. 29.

Referring to FIG. 13, there are shown height-adjustable tables 200 and 201 in accordance with another embodiment of the invention. Tables 200 and 201 are identical in construction. Table 200 comprises worktop or tabletop 202 which has top surface 204 and bottom surface 206. Top surface 204 is the work surface. Table 200 further comprises height-adjustable legs 208 and 210. Base members 212 and 214 are attached to the bottom ends of legs 208 and 210, respectively. Base members 212 and 214 are also shown in FIG. 18. Base members 212 and 214 are configured to contact the floor. In one embodiment, each leg 208 and 210 is comprised of telescopic sections.

In one embodiment, each height-adjustable leg 208 and 210 is configured as the adjustable leg described in U.S. Pat. No. 9,204,715, entitled "Adjustable Leg For A Table", the disclosure of which patent is hereby incorporated by reference. In another embodiment, each height-adjustable leg 208 and 210 is configured as the lifting column described in U.S. Pat. No. 9,144,301, entitled "Lifting Column, Preferably For Height Adjustable Tables", the disclosure of which patent is hereby incorporated by reference. These are just examples. It is to be understood that any suitable technique may be used to realize height-adjustable legs 208 and 210.

Referring to FIGS. 13, 14 and 21-27, table 200 further comprises electrical power center 300 that is attached to the bottom surface 206. Electrical power center 300 comprises housing 301. Housing 301 comprises rear wall section 302 and sidewall sections 304 and 305 that are attached to and extend from rear wall section 302. Housing 301 includes door 307 that is movably or pivotably attached to sidewall sections 304 and 305. Door 307 includes handle 307A. Electrical power center 300 includes top section 308 that is configured to be removably attached to bottom surface 206 of table 200 by inserting fasteners (e.g. screws) through through-holes 310. Electrical power center 300 further includes utility receptacle support member 312 that is attached to top section 308 (see FIGS. 21 and 23). Utility receptacle support member 312 includes electrical power source receptacles (e.g. 110-120 VAC) 320, 322 and 324 and USB device charging ports 326. Utility receptacle support member 312 further includes USB voltage converter circuitry (not shown) that converts 110-120 VAC to a DC voltage that is used to charge devices such as smart phones, iPads, etc. This DC voltage is provided to the USB device charging ports 326. Utility receptacle support member 312 includes electrical interface connectors 350 and 352. Sidewall sections 304 and 305 have openings 353 and 354, respectively. Electrical interface connectors 350 and 352 extend through openings 353 and 354, respectively. Electrical interface connectors 350 and 352 are electrically connected to the internal wiring of utility receptacle support member 312. This internal wiring is electrically connected to the utility receptacles 320, 322 and 324, and the USB voltage converter circuitry. In one embodiment, electrical interface connectors 350 and 352 are male electrical connectors. Since electrical power center 300 is attached to bottom surface 206 of table 200, the electrical power center 300 moves upward with worktop 202 when the height of table 200 is increased and also moves downward with worktop 202 when the height of table 200 is decreased.

Electrical power center 300 includes storage compartment 370 to manage and store all the power cords and cables so as to prevent these cords and cables from becoming tangled under table 200. Such a feature prevents damage to these power cords and cables during use of table 200. A user can plug the electrical power cords for his or her computer or computer screen, or other equipment, into electrical power source receptacles 320, 322 and 324 in electrical power center 300. The user may plug a smart phone, tablet, iPad or similar device into one of the USB charging ports 326. All excess portions of the electrical power cords, cables, smart phone charging cords, etc. can be neatly wrapped up and stored in storage compartment 370. Therefore, all excess portions of the cables and cords will also move upward with worktop 202 as the height of table 200 is increased and will move downward with worktop 202 as the height of table 200 is decreased. As shown in FIGS. 13 and 18, electrical power center 300 is conveniently located adjacent the lengthwise edge of table 200 to facilitate use of the power center 300 by the user.

Referring to FIGS. 13, 15, 18, 19 and FIGS. 28-32, table 200 further includes bracket 375 that is removably attached to bottom side 206 of table 200. Bracket 375 can be made from any suitable material, e.g. metal, plastic, rubber, composite materials, etc. Bracket 375 comprises section 376. Section 376 includes extending section 377. Bracket 375 further comprises sidewalls 378 and 380 that downwardly extend from section 376. Flange portions 382 and 384 extend from sidewalls 378 and 380, respectively. Flange portions 382 and 384 are substantially perpendicular to sidewalls 378 and 380, respectively. Flange portions 382 and 384 include openings 385 that are sized for receiving fastening devices such as screws, nails, rivets or similar fasteners which allow bracket 375 to be attached to bottom side 206 of table 200. In another embodiment, bracket 375 is rigidly attached to bottom side 206. Bracket 375 further comprises rear wall 386 that downwardly extends from section 376. Rear wall 386 has a notch 388. The purpose of notch 388 is described in the ensuing description. Section 376 has a directional arrow 390 thereon. Directional arrow 390 can be formed by any suitable technique such as stamping or engraving. In other embodiments, the directional arrow 390 can be formed on section 376 during the formation or manufactures of bracket 375. In a further embodiment, directional arrow 390 is formed by a decal. The purpose of directional arrow 390 is discussed in the ensuing description.

Table 200 further comprises flexible electrical power cable 500. Cable 500 comprises electrical interface connectors 502 and 504. Electrical interface connector 502 is electrically connected to electrical interface connector 352 of electrical power center 300. Electrical interface connector 504 is supported by bracket 375 such that electrical interface connector 504 is positioned between section 376 of bracket 375 and bottom side 206 of table 200 and cable 500 extends through notch 388. In one embodiment, bracket 375 is sized so that electrical connector 504 is pressed against bottom side 206. Table 200 further includes flexible electrical power cable 250. Cable 250 includes a first electrical interface connector 252 and a second electrical interface connector (not shown) which is supported by bracket 260. Bracket 260 is attached to bottom surface 206 of table 200 and has the same structure and performs the same type of function as bracket 375.

As shown in FIGS. 13 and 18, table 201 is identical in construction to table 200. Table 201 comprises worktop or tabletop 402 which has top surface 404 and bottom surface 406. Top surface 404 is the work surface. Table 201 further comprises height-adjustable legs 408 and 410. Plate members 412 and 414 are attached to the bottom ends of legs 408 and 410, respectively. Plate members 412 and 414 are also shown in FIG. 18. Plate members 412 and 414 are configured to contact the floor.

Referring to FIGS. 13-18, there is shown flexible electrical power cable 600 between tables 200 and 201. Cable 600 functions as an interconnecting cable. Cable 600 comprises electrical interface connectors 602 and 604. Electrical interface connector 602 is electrically connected to electrical interface connector 504 which is supported by bracket 375. Directional arrow 390 indicates the direction in which a user must move electrical interface connector 602 in order to completely electrically connect electrical interface connector 602 to electrical interface connector 504. Referring to FIG. 13, table 201 includes bracket 650 which is attached to bottom surface 406 of table 201 in the same manner in which bracket 375 is attached to bottom surface 206 of table 200. Bracket 650 has the same structure and performs the same type of function as bracket 375. Referring to FIG. 13, another flexible interconnecting electrical power cable, not shown but similar to cable 600, may be electrically connected between the electrical interface connector of cable 250, which is supported by bracket 260, and another height-adjustable table (not shown) that is in the chain of height-adjustable tables.

Referring to FIG. 13, table 201 includes electrical power center 670 which is attached to the bottom surface 406 of table 201. Electrical power center 670 has the same configuration and performs the same type of function as electrical power center 300. Electrical power center 670 comprises housing 672 and sidewalls 674 and 676. Electrical power center 670 further comprises electrical interface connectors on sidewalls 674 and 676 which perform the same type of function as electrical interface connectors 350 and 352, respectively, of electrical power center 300. Electrical power center 670 is conveniently located adjacent a lengthwise end of table 201 to facilitate use of the power center 670 by the user.

Referring to FIGS. 13-18 and 20, table 201 further includes flexible electrical power cable 700. Flexible electrical power cable 700 comprises a first electrical interface connector (not shown) that is supported by bracket 650 and is electrically connected to electrical interface connector 604 of cable 600. Flexible electrical power cable 700 comprises a second electrical interface connector 704. Electrical interface connector 704 is electrically connected to the electrical interface connector on sidewall 674 of electrical power center 670. Table 201 includes flexible electrical power cable 800. Cable 800 has the same configuration as cable 700 and comprises electrical interface connector 802 which is electrically connected to the electrical interface connector on sidewall 676 of electrical power center 670. Flexible electrical power cable 800 comprises a second electrical interface connector, the view of which is obscured by bracket 680. Bracket 680 supports this second electrical interface connector in the same manner in which bracket 375 supports electrical interface connector 504. Referring to FIG. 13, flexible electrical power distribution cable 900 comprises electrical interface connector 902 that is supported by bracket 680 and electrically connected to the second electrical interface connector (not shown) of cable 800. Cable 900 further comprises electrical interface connector 904.

In accordance with the invention, the electrical interface connectors of cables 500, 600, 700, 800 and 900 are configured as a Powerpole® connector assemblies manufactured by Anderson Power Products, Inc. of Sterling, Mass. Such Powerpole® connector assemblies may be of male or female configuration. A powerpole connector assembly is described in U.S. Pat. No. 7,004,795 entitled "Powerpole Connector Assembly And Method Therefor", the disclosure of which patent is hereby incorporated by reference. A powerpole connector is also described in U.S. Pat. No. D604,246, entitled "Electrical Connector", the disclosure of which patent is hereby incorporated by reference. The mark "Powerpole" is a trademark owned by Anderson Power Products, Inc. and is known in the art. In one embodiment, the electrical interface connectors of flexible electrical power cables 250, 500, 600, 700, 800 and 900 and the electrical interface connectors of electrical power centers 300 and 670 are configured as Powerpole® connectors manufactured by Anderson Power Products, Inc. under part numbers 1460G1 and 1461G1 (4-wire cable ends), 1460G3 and 1461G3 (8-wire cable ends), 1327GX (connectors) and 261G (terminals).

Electrical interface connector 904 of cable 900 can be either electrically connected to an electrical interface connector of another height-adjustable table or electrically connected to an AC electrical power source. For example, if table 201 is the first table in the chain, then electrical interface connector 904 is electrically connected to an electrical power outlet that is mounted in a wall or the floor which provides AC power. In one embodiment, the electrical power outlet mounted in the wall or floor is the electrical power outlet described in U.S. Pat. No. 9,054,469, entitled "Electrical Power Outlet", the disclosure of which patent is hereby incorporated by reference. In such an embodiment, electrical power flows from the AC power source and through cables 900 and 800, through electrical power center 670, cable 700, interconnecting cable 600 and then through cable 500, electrical power center 300 and cable 250. Cable 250 may be electrically connected to an interconnecting cable that is electrically connected to another height-adjustable table in the chain. In another example, cable 900 functions as an interconnecting cable wherein electrical interface connector 904 is electrically connected to an electrical interface connector on another height adjustable table in the chain of height-adjustable tables.

In one embodiment, the electrical interface connectors of flexible electrical power cables 250, 500, 600, 700, 800 and 900 and the electrical interface connectors of electrical power centers 300 and 670 are configured as Powerpole® connectors having part numbers 1460G1 and 1461G1 (4-wire cable ends), 1460G3 and 1461G3 (8-wire cable ends), 1327GX (connectors) and 261G (terminals).

Interconnecting cables 600, 900 and the other connecting cables are not configured as IGUS® Chainflex® power cables described with respect to the embodiment of FIG. 1. Instead, each cable 600 and 900, and any other connecting cables in the chain are comprised of a plurality of wires that are wrapped together with nylon mesh.

The invention allows for a plurality of tables to be daisy-chained together using identical interconnecting flexible electrical power cables, such as cables 600 and 900. The flexibility of cables 600 and 900 allows the height of each table 200 and 201 to be raised or lowered independent of the other tables in the daisy-chain configuration without causing any type of interruption in electrical connectivity. Only one table need be directly electrically connected to an AC power source.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A height-adjustable table, comprising:
a worktop having a top surface, a bottom surface, a first end and an opposite second end, the worktop including a front lengthwise edge;
a first adjustable leg having an upper end and a lower end, the upper end being attached to the bottom surface of the worktop;

a second adjustable leg having an upper end and a lower end, the upper end of the second adjustable leg being attached to the bottom surface of the worktop;
said first and second adjustable legs allowing the height of the worktop to be increased or decreased;
an electrical power center attached to the bottom surface of the worktop such that the electrical power center moves upward or downward with the worktop as the height of the worktop is increased or decreased, the electrical power center being adjacent to the front lengthwise edge of the worktop in order to facilitate use of the electrical power center by a user, the electrical power center comprising a housing, a plurality of electrical interface connectors mounted to the housing and electrically connected to each other, each electrical interface connector being adapted to provide an AC voltage, the electrical power center further including at least one AC electrical power receptacle that is electrically connected to the electrical interface connectors and configured to provide an AC voltage, the electrical power center including an interior storage compartment that is sized to receive electrical cables or wires;
a first power cable having first and second electrical interface connectors, wherein the first electrical interface connector of the first power cable is electrically connected to one of the electrical interface connectors of the electrical power center and the second electrical interface connector of the first power cable is secured to the bottom surface of the worktop; and
a second power cable having first and second electrical interface connectors, wherein the first electrical interface connector of the second power cable is electrically connected to another of the electrical interface connectors of the electrical power center and the second electrical interface connector of the second power cable is secured to the bottom surface of the worktop.

2. The height adjustable table according to claim 1 wherein the electrical power center comprises an electrical power receptacle support member that is attached to the housing, the electrical power receptacle being supported by the electrical power receptacle support member.

3. The height adjustable table according to claim 1 wherein the electrical power center further includes at least one USB charging port and voltage converter circuitry to convert the AC voltage provided by one of the electrical interface connectors into a DC voltage and current and to provide the DC voltage and current to the at least one USB charging port.

4. The height adjustable table according to claim 1 wherein the electrical power center further includes a door that is movably attached to the housing of the electrical power center, the door being movable to an open position to provide access to the interior storage compartment and to a closed position to conceal the interior storage compartment.

5. The height adjustable table according to claim 1 further comprising a first interconnecting flexible electrical power cable having a first electrical interface connector electrically connected to the second electrical interface connector of the first power cable and a second electrical interface connector adapted to be electrically connected to an electrical interface connector of an electrical power cable of a second height adjustable table.

6. The height adjustable table according to claim 5 further comprising a second interconnecting flexible electrical power cable having a first electrical interface connector electrically connected to the second electrical interface connector of the second power cable and a second electrical interface connector adapted to be electrically connected to an electrical interface connector of a power cable of a third height adjustable table.

* * * * *